(12) United States Patent
Liu et al.

(10) Patent No.: US 10,600,399 B2
(45) Date of Patent: Mar. 24, 2020

(54) SMART PIANO SYSTEM

(71) Applicant: SUNLAND INFORMATION TECHNOLOGY CO., LTD., Shanghai (CN)

(72) Inventors: Xiaolu Liu, Shanghai (CN); Yangyi Teng, Shanghai (CN)

(73) Assignee: SUNLAND INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/033,641

(22) Filed: Jul. 12, 2018

(65) Prior Publication Data

US 2018/0322856 A1   Nov. 8, 2018

Related U.S. Application Data

(63) Continuation of application No. PCT/CN2016/080224, filed on Apr. 26, 2016.

(30) Foreign Application Priority Data

Jan. 15, 2016 (CN) .......................... 2016 1 0027133
Jan. 15, 2016 (CN) .......................... 2016 1 0027147
(Continued)

(51) Int. Cl.
*G10H 1/44* (2006.01)
*G10H 1/00* (2006.01)
(Continued)

(52) U.S. Cl.
CPC .............. *G10H 1/44* (2013.01); *G01P 13/00* (2013.01); *G09B 15/00* (2013.01); *G10C 3/00* (2013.01);
(Continued)

(58) Field of Classification Search
CPC .... G10H 1/344; G10H 1/0008; G10H 1/0016; G10H 1/00; G10H 2220/221;
(Continued)

(56) References Cited

U.S. PATENT DOCUMENTS 5,231,283 A    7/1993  Starkey et al.
5,908,997 A *  6/1999  Arnold .................. G09B 15/04
                                                84/478
(Continued)

FOREIGN PATENT DOCUMENTS

CN            2646826 Y       10/2004
CN            1624758 A        6/2005
(Continued)

OTHER PUBLICATIONS

International Search Report in PCT/CN2016/080224 dated Oct. 20, 2016, 5 pages.
(Continued)

*Primary Examiner* — Jeffrey Donels
(74) *Attorney, Agent, or Firm* — Metis IP LLC

(57) ABSTRACT

Systems and methods for providing a piano system are provided. In some embodiments, the methods include receiving a plurality of key signals related to a first performance of a piece of music, wherein each of the plurality of key signals corresponds to motion of at least one key of a piano during the first performance; generating first performance information based on the plurality of key signals; receiving musical data related to a second performance of the piece of music; receiving musical data related to a second performance of the piece of music, generating second performance information based on the musical data; and providing content for presentation on a display device based on the first performance information and the second performance information. The methods can also include receiving
(Continued)

at least one pedal signal corresponding to motion of a pedal of the piano during the first performance, and generating first performance information based on the pedal signal.

16 Claims, 32 Drawing Sheets

(30) Foreign Application Priority Data

| | | |
|---|---|---|
| Jan. 15, 2016 | (CN) | 2016 1 0027156 |
| Jan. 15, 2016 | (CN) | 2016 1 0028648 |
| Jan. 15, 2016 | (CN) | 2016 1 0028650 |
| Jan. 15, 2016 | (CN) | 2016 1 0028718 |
| Jan. 28, 2016 | (CN) | 2016 1 0059034 |
| Jan. 28, 2016 | (CN) | 2016 2 0088254 U |
| Apr. 7, 2016 | (CN) | 2016 1 0213505 |

(51) Int. Cl.

| | |
|---|---|
| G09B 15/00 | (2006.01) |
| G10C 3/00 | (2019.01) |
| G10H 1/34 | (2006.01) |
| G01P 13/00 | (2006.01) |
| G10C 3/20 | (2006.01) |
| G10F 1/02 | (2006.01) |
| G10C 3/12 | (2006.01) |

(52) U.S. Cl.
CPC ............. *G10C 3/12* (2013.01); *G10C 3/20* (2013.01); *G10F 1/02* (2013.01); *G10H 1/00* (2013.01); *G10H 1/0008* (2013.01); *G10H 1/0016* (2013.01); *G10H 1/344* (2013.01); *G10H 2220/015* (2013.01); *G10H 2220/091* (2013.01); *G10H 2220/201* (2013.01); *G10H 2220/221* (2013.01); *G10H 2220/275* (2013.01); *G10H 2220/305* (2013.01); *G10H 2230/011* (2013.01)

(58) Field of Classification Search
CPC ....... G10H 2220/091; G10H 2220/305; G10H 2220/015; G10H 2230/011; G10C 3/00; G09B 15/00
USPC .......................................................... 84/744
See application file for complete search history.

(56) References Cited

U.S. PATENT DOCUMENTS

| | | | | |
|---|---|---|---|---|
| 6,069,310 A * | 5/2000 | James | G10H 1/0058 | 84/622 |
| 6,084,167 A * | 7/2000 | Akimoto | G10H 1/32 | 84/477 R |
| 6,160,213 A * | 12/2000 | Arnold | G09B 15/04 | 84/477 R |
| 6,297,437 B1 | 10/2001 | Ura et al. | | |
| 6,362,405 B2 * | 3/2002 | Koseki | G10H 1/24 | 84/171 |
| 6,388,181 B2 * | 5/2002 | Moe | G09B 15/08 | 84/470 R |
| 6,476,304 B2 * | 11/2002 | Uehara | G10H 1/0008 | 704/231 |
| 6,921,856 B2 * | 7/2005 | Koseki | G10H 1/0008 | 84/603 |
| 7,094,961 B2 * | 8/2006 | Ura | G10F 1/02 | 714/30 |
| 7,297,858 B2 * | 11/2007 | Paepcke | G10H 1/0066 | 84/609 |
| 7,332,669 B2 | 2/2008 | Shadd | | |
| 7,361,829 B2 * | 4/2008 | Uehara | G10G 1/02 | 84/477 R |
| 7,723,598 B2 * | 5/2010 | Sasaki | G09B 15/06 | 84/470 R |
| 7,893,337 B2 * | 2/2011 | Lenz | G09B 15/02 | 84/477 R |
| 8,253,006 B2 * | 8/2012 | Kim | G10H 1/20 | 84/609 |
| 8,338,684 B2 * | 12/2012 | Pillhofer | G09B 15/00 | 84/470 R |
| 8,502,059 B2 * | 8/2013 | Sasaki | G10H 1/34 | 84/615 |
| 2004/0206225 A1 | 10/2004 | Wedel | | |
| 2005/0139060 A1 | 6/2005 | Muramatsu | | |
| 2005/0204908 A1 * | 9/2005 | Uehara | G10G 1/02 | 84/746 |
| 2006/0272483 A1 * | 12/2006 | Honeywell | G10F 1/02 | 84/609 |
| 2007/0051792 A1 | 3/2007 | Wheeler et al. | | |
| 2008/0178726 A1 | 7/2008 | Honeywell | | |
| 2008/0190261 A1 | 8/2008 | Kenagy et al. | | |
| 2009/0235810 A1 | 9/2009 | Yaguchi | | |
| 2010/0077905 A1 | 4/2010 | Hammond | | |
| 2010/0212477 A1 | 8/2010 | Delong et al. | | |
| 2014/0251114 A1 | 9/2014 | Yoshikawa | | |

FOREIGN PATENT DOCUMENTS

| | | |
|---|---|---|
| CN | 101118690 A | 2/2008 |
| CN | 101266516 A | 9/2008 |
| CN | 201111849 Y | 9/2008 |
| CN | 101452384 A | 6/2009 |
| CN | 101726024 A | 6/2010 |
| CN | 101916560 A | 12/2010 |
| CN | 102110434 A | 6/2011 |
| CN | 202102617 U | 1/2012 |
| CN | 102479501 A | 5/2012 |
| CN | 102664000 A | 9/2012 |
| CN | 102722334 A | 10/2012 |
| CN | 103093803 A | 5/2013 |
| CN | 103150940 A | 6/2013 |
| CN | 202995737 U | 6/2013 |
| CN | 103247200 A | 8/2013 |
| CN | 103472956 A | 12/2013 |
| CN | 203422918 U | 2/2014 |
| CN | 203456074 U | 2/2014 |
| CN | 103778905 A | 5/2014 |
| CN | 103903602 A | 7/2014 |
| CN | 103903603 A | 7/2014 |
| CN | 103943094 A | 7/2014 |
| CN | 104078032 A | 10/2014 |
| CN | 104157275 A | 11/2014 |
| CN | 104157276 A | 11/2014 |
| CN | 104200716 A | 12/2014 |
| CN | 204143369 U | 2/2015 |
| CN | 104681017 A | 6/2015 |
| CN | 204390723 U | 6/2015 |
| CN | 104835485 A | 8/2015 |
| CN | 204596404 U | 8/2015 |
| CN | 204614281 U | 9/2015 |
| CN | 104977904 A | 10/2015 |
| CN | 105895066 A | 8/2016 |
| CN | 106981233 A | 7/2017 |
| EP | 2571007 A2 | 3/2013 |
| JP | H07244486 A | 9/1995 |
| JP | 2003255929 A | 9/2003 |
| JP | 2005092057 A | 4/2005 |
| JP | 2011211603 A | 10/2011 |
| JP | 2013037237 A | 2/2013 |
| JP | 2013160845 A | 8/2013 |
| KR | 20120094797 A | 8/2012 |
| KR | 101524279 B1 | 6/2015 |
| WO | 2009104933 A2 | 8/2009 |

OTHER PUBLICATIONS

Written Opinion in PCT/CN2016/080224 dated Oct. 20, 2016, 6 pages.

(56) References Cited

OTHER PUBLICATIONS

First Office Action in Chinese Application No. 201610213505.5 dated Dec. 28, 2017, 17 pages.
First Office Action in Chinese Application No. 201610027133.7 dated Mar. 15, 2019, 18 pages.
First Office Action in Chinese Application No. 201610027147.9 dated Mar. 11, 2019, 15 pages.
First Office Action in Chinese Application No. 201610027156.8 dated Mar. 14, 2019, 15 pages.
First Office Action in Chinese Application No. 201610028718.0 dated Mar. 5, 2019, 16 pages.
First Office Action in Chinese Application No. 201610059034.7 dated Mar. 5, 2019, 15 pages.
Second Office Action in Chinese Application No. 201610213505.5 dated Feb. 19, 2019, 17 pages.

* cited by examiner

SMART PIANO SYSTEM

CROSS-REFERENCE TO RELATED APPLICATIONS

This application is a Continuation of International Application No. PCT/CN2016/080224, filed on Apr. 26, 2016, which claims priority of Chinese Application No. 201610028648.9 filed on Jan. 15, 2016, Chinese Application No. 201610028650.6 filed on Jan. 15, 2016, Chinese Application No. 201610027133.7 filed on Jan. 15, 2016, Chinese Application No. 201610027147.9 filed on Jan. 15, 2016, Chinese Application No. 201610027156.8 filed on Jan. 15, 2016, Chinese Application No. 201610028718.0 filed on Jan. 15, 2016, Chinese Application No. 201610059034.7 filed on Jan. 28, 2016, Chinese Application No. 201620088254.8 filed on Jan. 28, 2016, and Chinese Application No. 201610213505.5 filed on Apr. 7, 2016, the entire contents of each of which are hereby incorporated by reference.

TECHNICAL FIELD

This application relates to a smart piano system, and more particularly, to a computer-implemented system and method to provide visualized and personalized piano system.

BACKGROUND

A piano (e.g., an acoustic piano) is a musical instrument played using a keyboard. The piano may include a protective case, a soundboard, metal strings, hammers, keys (e.g., white keys and black keys), and pedals. The keys may be mechanically connected to hammers. When a key of the acoustic piano is pressed by a player, a hammer may strike the metal strings and the strings may vibrate at their respective resonant frequency. These vibrations may be transmitted to the soundboard and amplified by coupling the acoustic energy to the air. A note produced by the piano may be sustained, by application of one or more pedals of the piano, even when the keys are released.

As one of the world's most popular musical instruments, the piano is widely played and studied today. A piano student (especially a beginning student) may find it difficult to learn fingering and hand positions, fingering sequences, pedaling techniques, and other piano techniques. Accordingly, it is desirable to provide a visualized and personalized teaching system and method to assist in learning piano.

SUMMARY

Systems, methods, and media for providing a piano system are provided. In some embodiments, the smart piano system includes a processing device to: receive a plurality of key signals related to a first performance of a piece of music, wherein each of the plurality of key signals corresponds to motion of at least one key of a piano during the first performance; generate first performance information based on the plurality of key signals; receive musical data related to a second performance of the piece of music; generate second performance information based on the musical data; and provide content for presentation on a display device based on the first performance information and the second performance information.

In some embodiments, the processing device further receives at least one pedal signal corresponding to motion of a pedal of the piano during the first performance, and generates the first performance information based on the pedal signal.

In some embodiments, the piano system further includes a plurality of sensors configured to generate the plurality of key signals.

In some embodiments, the plurality of sensors includes at least one of an opto-electric sensor, a magneto-electric sensor, an angle sensor, or a piezo-electric sensor.

In some embodiments, the processing device is further to determine positional information about a first key of the piano based on a first key signal, wherein the plurality of key signals includes the first key signal.

In some embodiments, to determine the positional information, the processing device is further to compare a plurality of values of the first key signal with a plurality of reference values, wherein the plurality of reference values corresponds to a plurality of positions of the first key.

In some embodiments, to provide the content to be presented on the display device, the processing device is further to generate at least one display parameter for displaying the content.

In some embodiments, the processing device is further to generate the content based on the second performance information, wherein the content includes at least one content item indicative of a strength to be applied to a key of the piano, an operation sequence of a plurality of keys of the piano, or a music sheet.

In some embodiments, the first performance information includes at least one of an operation sequence of a plurality of piano keys, positional information about the piano keys, or a musical note.

In some embodiments, the second performance information includes at least one of an operation sequence of a plurality of piano keys, positional information about the piano keys, or a musical note.

In some embodiments, the content includes at least one virtual keyboard, and wherein the virtual keyboard includes a plurality of virtual keys corresponding to a plurality of keys of the piano.

In some embodiments, the processing device is further to perform sound compensation based on at least one of information of an acoustic environment, a type of the piano, or the first performance information.

In some embodiments, to perform the sound compensation, the processing device is further to generate at least one parameter about at least one of a volume, a frequency, or timbre.

In some embodiments, the processing device is further to: compare the first performance information with the second performance information; detect at least one error in the first performance based on the comparison; and provide the content based on the error.

In some embodiments, a method for providing a piano system may include: receiving a plurality of key signals related to a first performance of a piece of music, wherein each of the plurality of key signals corresponds to motion of at least one key of a piano during the first performance; generating first performance information based on the plurality of key signals; receiving musical data related to a second performance of the piece of music; generating second performance information based on the musical data; and providing content for presentation on a display device based on the first performance information and the second performance information. The method may also include: receiving at least one pedal signal corresponding to motion of a pedal of the piano during the first performance; and generating the first performance information based on the pedal signal.

In some embodiments, a non-transitory computer-readable medium is provided. The non-transitory computer-readable medium include instructions that, when accessed by a processing device, cause the processing device to: receive a plurality of key signals related to a first performance of a piece of music, wherein each of the plurality of key signals corresponds to motion of at least one key of a piano during the first performance; generate first performance information based on the plurality of key signals; receive musical data related to a second performance of the piece of music; generate second performance information based on the musical data; and provide content for presentation on a display device based on the first performance information and the second performance information.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
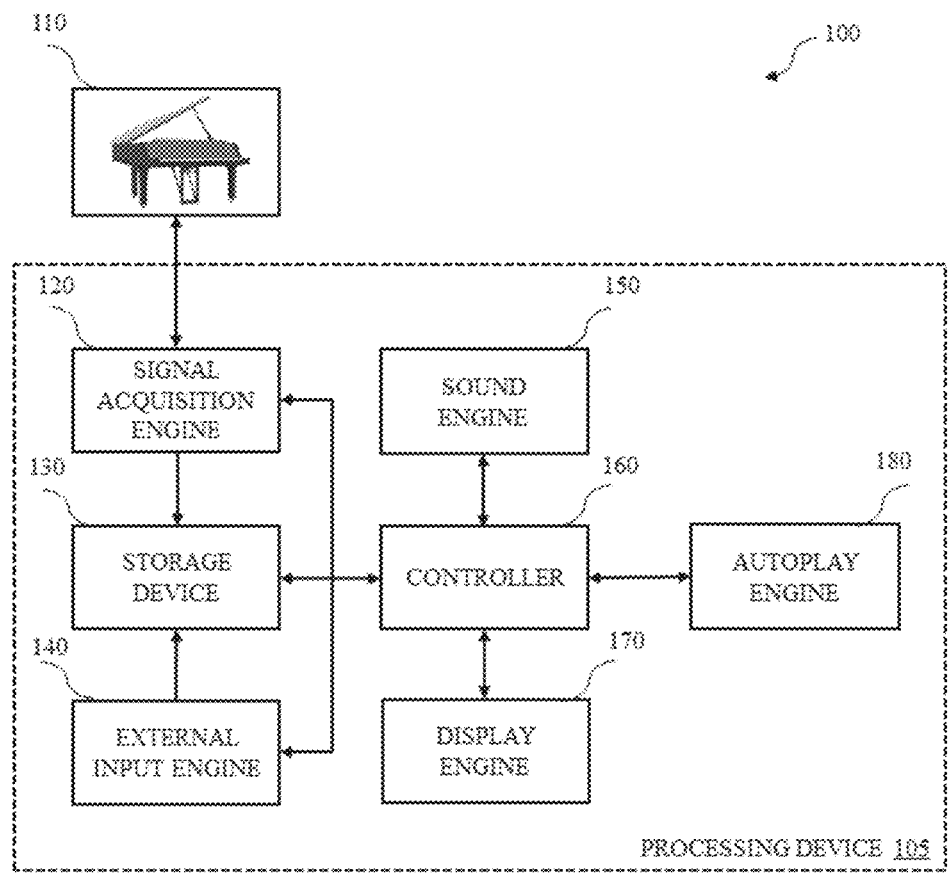
FIG. 1 is a block diagram illustrating an example of a smart piano system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "module," and/or "engine" used herein are one method to distinguish different components, elements, parts, section or assembly of different level in ascending order. However, the terms may be displaced by other expression if they may achieve the same purpose.

It will be understood that when a unit, module or engine is referred to as being "on," "connected to" or "coupled to" another unit, module, or engine, it may be directly on, connected or coupled to, or communicate with the other unit, module, or engine, or an intervening unit, module, or engine may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure provides for a smart piano system that can be coupled with a musical instrument with one or more keyboards (e.g., a piano). In some embodiments, the smart piano system and/or one or more portions of the smart piano system may be integrated with the musical instrument. In some embodiments, the smart piano system and/or one or more portions of the smart piano system may be implemented as stand-alone devices.

The smart piano system can perform analysis on information about a piano performance by a player, such as information about one or more keys and/or pedals of the piano during the performance. In some embodiments, the smart piano system can include multiple sensors that can detect motion of the keys. Each of the sensors may generate a signal representative of motion of a key of the piano during the performance. The signal may be processed and/or analyzed to determine positional information about the key. For example, various positions of the key during the performance can be determined based on the signal (e.g., by comparing sampled values of the signal with multiple reference values corresponding to the positions). As another example, timestamps corresponding to the positions during the performance may be determined. In some embodiments, the smart piano system may also determine a strength applied to the key, a note duration produced by pressing the key, etc. based on the signal.

The smart piano system can also provide sound compensation based on information about the performance (e.g., the information about the motion of the keys and/or pedals), information about the piano (e.g., a type of the piano such as an upright piano, a grand piano, etc.), information about an acoustic environment in which the performance is rendered, and/or any other information. For example, the compensation may be performed based on a strength applied to a key of the piano, a note duration produced by pressing the key, positional information about the key, and/or any other information about the performance. As another example, the compensation may be performed based on the type of the piano (e.g., an upright piano) to compensate acoustic sounds produced by the piano.

The smart piano system can include a display device that can present content related to the performance, music played in the performance, another performance of the music, and/or any other information. The content may be and/or include audio content, video content, images, text, graphics, etc. In some embodiments, the size of a screen of the display device may be adapted to the size of a keyboard of the piano. A virtual keyboard may be displayed on the screen. The virtual keyboard can include multiple virtual keys corresponding to actual keys of the piano. In some embodiments, the number of the virtual keys and the number of the actual keys may be the same. Information about one or more operations to be performed on an actual piano key may be displayed in a portion of the screen including its corresponding virtual key. Such information may include, for example, timing information related to depression and/or release of the actual piano key, a strength to be applied to the actual piano key, a note duration, a note value, etc. In some embodiments, various types of information may be presented on the screen during the performance.

As such, the smart piano system can provide a user (e.g., a player, a piano student, etc.) with visualized and personalized piano learning experience.

FIG. 1 is a block diagram illustrating an example 100 of a smart piano system according to some embodiments of the present disclosure. As shown in FIG. 1, the smart piano system 100 may include a piano 110 and a processing device 105. The processing device 105 may further include a signal acquisition engine 120, a storage device 130, an external input engine 140, a sound engine 150, a controller 160, a display engine 170, an autoplay engine 180, and/or any other component for providing a smart piano system. More or less components may be included in system 100 and/or processing device 105 without loss of generality. For example, two of the modules may be combined into a single module, or one of the modules may be divided into two or more modules. In one implementation, one or more of the modules may reside on different computing devices (e.g., desktops, laptops, mobile phones, tablet computers, wearable computing devices, etc.). In some embodiments, one or more portions of the processing device 105 and/or the processing device 105 may be integrated with the piano 110.

The piano 110 may be an acoustic piano, an electric piano, an electronic piano, a digital piano, and/or any other musical instrument with a keyboard. A non-exclusive list of an acoustic piano that may be used in connection with some embodiments of the present disclosure may include a grand piano, an upright piano, a square piano, a specialized piano (such as a toy piano, a minipiano, a prepared piano, etc.), etc.

The signal acquisition engine 120 may obtain information about a performance by a player (also referred to herein as "first performance information"). The first performance information may include but is not limited to information about one or more keys of piano 110 that are pressed during the performance, timing information about the keys (e.g., a time instant corresponding to a position of a key), one or more operation sequences of the keys, timing information about when a user applies one or more pedals of piano 110, and musical notes produced according to motions of the keys/pedals. The first performance information may be acquired via one or more sensors (e.g., one or more sensors described in connection with FIGS. 4A-6 below). The first performance information may be generated based on key signals and/or pedal signals acquired by the sensors. In some embodiments, each of the key signals and pedal signals may be an electric signal represented by current values, voltage values, and/or any other parameter. When a player fingers on the keyboard of the piano and/or operates the pedals, the first performance information may be recorded. The first performance information may be stored in the storage device 130 and/or any other storage device. The first performance information may also be obtained without the player fingering on the keyboard. In some embodiments, the smart piano system may be equipped with actuators of keys and/or pedals to operate the keys and/or pedals. The actuators of keys and/or pedals may strike the keys and/or operate the pedals according to instructions provided by the external input engine 140.

The storage device 130 may be and/or include any device that is capable of storing data, such as data provided by the signal acquisition engine 120, the external input engine 140, the controller 160, the sound engine 150, the display engine 170, and/or any other device. Exemplary types of data that may be stored in the storage device 130 may include key signals and pedal signals acquired by the signal acquisition engine 120, performance data generated by the signal acquisition engine 120, musical data from the external input engine 140, and/or any other type of data that may be used to implement a smart piano system in accordance with various embodiments of the present disclosure. The storage device 130 may include one or more components. In some embodiment, the storage device 130 can be and/or include a hard disk drive, a solid-state drive, a removable storage drive (e.g., a flash memory disk drive, an optical disk drive, etc.), a digital video recorder, the like, or a combination thereof.

The external input engine 140 may be configured to connect the smart piano system to external data sources. In some embodiments, the external data source may be received via a computer network (e.g., the Internet, an intranet, etc.). For instance, musical data related to a piece of music may be obtained via the Internet and processed by the smart piano system. In some embodiments, the external data sources may be electronic devices. Exemplary electronic devices include a mobile device (e.g., a smart phone, a laptop computer, a tablet computing device, a wearable computing device, or the like), a personal computer, the like, or a combination thereof. In some embodiments, the external input engine 140 may be configured to receive one or more user inputs. In some embodiments, the external input engine 140 may include one or more input devices, user interfaces (not shown in the figure), and/or any other device that is capable of receiving, processing, transmitting, etc. user inputs. A user interface may include one or more screens for indicating functions the player may choose to perform. Exemplary input devices may be a computer keyboard, a piano keyboard, a touch sensitive screen, a mouse, a remote controller, the like, or any combination thereof. An input device may include alphanumeric and other keys that may be inputted via a keyboard, a touch screen (for example, with haptics or tactile feedback), a voice-command input, an eye tracking input, a brain monitoring system, or any other comparable input mechanism. The input received via the input device may then be communicated to the controller 160 and the storage device 130 via, for example, a data bus, for processing and storage. Other types of input devices include a cursor control device, such as a mouse, a trackball, or cursor direction keys to communicate direction information and command selections to, for example, the controller and to control cursor movement on a display device. In some embodiments, as will be described in more detail in connection with FIG. 21H, the input device may be and/or include one or more pedals that can receive input generated by a user's foot or feet. One or more functions of the smart piano system may be performed based on user input received via one or more of the pedals.

The sound engine 150 may include any device that is capable of generating audio content representative of acoustic sounds or electric sounds, such as one or more synthesizers, sequencers, audio codecs, signal processors, speakers, etc. The sound engine 150 may be configured to generate electric sounds and/or acoustic sounds. The acoustic sounds may be generated by acoustic parts of the acoustic piano 110, such as keys, pedals, hammers, strings, and/or any other portion of the acoustic piano 110 that can generate an acoustic sound. In some embodiments, the sound engine 150 may cause one or more actuators (now shown in FIG. 1) to generate acoustic sounds. The actuators may operate the keys/pedals under instructions provided by the controller 160 and/or the sound engine 150.

In some embodiments, the sound engine 150 can generate audio content using one or more synthesizers, sequencers, audio codecs, digital processors, and/or any other device that can generate audio content representative of electric sounds. The audio content can be played back using one or more speakers or any other device to produce electric sounds. The sound engine 150 can make various changes to the electric sounds. For instance, the electric sounds may be replaced or changed based on the player's instructions obtained by the smart piano system.

The electric sounds may be played simultaneously with the acoustic sounds or be played without the acoustic sounds. The electric sounds may be also discontinuously played when the acoustic sounds are being played. For instance, in one performance, the electric sounds may be triggered when a player starts to produce one or more selected musical notes. The electric sounds may be removed once the one or more selected musical notes have been played.

In some embodiments, the sound engine 150 can produce sounds based on musical data provided by the external input engine 140, the storage device 130, and/or any other device. Merely by way of example, the smart piano system may fetch musical data from a personal computer or a smart phone of the player. Then, the musical data may be converted into a form that is recognizable by the sound engine 150 and the display engine 170. And the sound engine 150 and the display engine 170 may present the musical data accordingly.

The controller 160 may be configured to generate instructions for the smart piano system. For example, the controller 160 can generate instructions to instruct one or more components of system 100 to perform various functions, such as generating signals, receiving data, processing data, storing data, transmitting data, presenting content (e.g., displaying video content and/or images, playing audio content, etc.). As will be discussed in more detail below, the instructions may include one or more instructions for implementing one or more modes executed by system 100, such as a teaching mode, an error detection mode, a sound compensation mode, a playback mode, etc. The controller 160 may process data provided by the signal acquisition engine 120, the storage device 130, the external input engine 140 or any other component of the smart piano system.

The controller 160 may comprise processor-based and/or microprocessor-based units. Merely by way of example, the processor may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an acorn reduced instruction set computing (RISC) machine (ARM), any other circuit and/or processor capable of executing the functions described herein, the like, or any combination thereof.

The display engine 170 may be configured to receive, generate, process, transmit, and/or display content related to performance information, musical data, and/or any other information. The content may include audio content, video content, images, graphic content, text, etc. The performance information can include any information about a performance of piano 110 by a player, a sample performance, and/or any other performance. The musical data may include any information about a piece of music (e.g., a piano piece), such as a musical sheet, a musical score, annotations, musical notes, note duration, note values, a title of the music, operation sequences of keys and/or pedals, a strength to be applied to one or more keys and/or pedals, endurance of and/or any other information about the music. The display engine 170 may also present instructions obtained from the controller 160. The instructions may include instructions for defining displaying sequence of the musical data, and the instructions for defining context of the musical data to be displayed.

The display engine 170 may include one or more display devices that can present musical data and/or any other content. Alternatively or additionally, the display engine 170 may be communicatively coupled to one or more display devices. The display engine 170 may provide the content and/or any other data to the display devices for presentation. Exemplary display devices include but are not limited to a liquid crystal display (LCD), a light emitting diode (LED)-based display, a flat panel display or curved screen, a television device, a cathode ray tube (CRT), the like, or a combination thereof. In some embodiments, one or more of the display devices can be three-dimensional capable. One or more of the display devices can include a touchscreen. In some embodiments, different display devices (e.g., displays of various types, shapes, sizes, etc.) may be selected and used for different types of pianos. For example, the size of the display device may be adapted to the size of the piano 110. More particularly, for example, a larger display may be used for a relatively larger piano (e.g., a grand piano) while a smaller display may be used for a relatively smaller piano (e.g., an upright piano, a baby grand piano, etc.). In some embodiments, the size of a screen of the display device may be determined based on the size of a keyboard of the piano 100. A virtual keyboard may be displayed on the screen. The virtual keyboard can include multiple virtual keys corresponding to actual keys of piano 110. In some embodiments, the number of the virtual keys and the number of the actual keys may be the same. Information about one or more operations to be performed on an actual piano key may be displayed in a portion of the screen including its corresponding virtual key. Such information may include, for example, timing information related to depressions and/or release of the actual piano key, a strength to be applied to the actual piano key, a note duration, a note value, etc. Various types of information can be displayed in various portions of the screen. In some embodiments, the virtual keyboard and other content can be presented using one or more user interfaces as described in connection with FIGS. 21A-21G.

The autoplay engine 180 may be configured to automatically present musical data. The musical data may be obtained from the storage device 130, the external input engine 140, and/or any other device. Merely by way of example, the musical data may be generated according to a performance of the player, and stored in the storage device 130. Exemplary musical data may include musical manuscript, one or more musical notes, timing of fingering one or more keys, timing of operating one or more pedals, sequences of fingering one or more keys, and sequences of operating one or more pedals, etc. The autoplay engine 180 may generate sounds and/or images based on the musical data. Merely by way of example, after musical notes are played by the player and stored as musical data in the storage device 130 by the smart piano system, the autoplay engine 180 may automatically acquire the musical data. The musical notes may then be generated with or without modifications. The autoplay engine 180 may also provide the sound engine 150 with the musical data and instructions for generating sounds. Then the sound engine 150 may generate sounds accordingly. The autoplay engine 180 may also provide the musical data and instructions for generating images to the display engine 170. Then the display engine 170 may present images accordingly.

In some embodiments, each of signal acquisition engine 120, storage device 130, external input engine 140, sound engine 150, controller 160, display engine 170, and the autoplay engine 180 may include and/or be any of a general purpose device such as a computer or a special purpose device such as a client, a server, and/or any other suitable device. Any of these general or special purpose devices may include any suitable components such as a hardware processor (which may be a microprocessor, digital signal processor, a controller, and/or any other suitable hardware processor), memory, communication interfaces, display controllers, input devices, and/or any other suitable components. For example, each of signal acquisition engine 120, storage device 130, external input engine 140, sound engine 150, controller 160, and display engine 170 may be implemented as or include a personal computer, a tablet computer, a wearable computer, a multimedia terminal, a mobile telephone, a gaming device, a set-top box, a television, and/or any other suitable device. Moreover, each of signal acquisition engine 120, storage device 130, external input engine 140, sound engine 150, controller 160, display engine 170, autoplay engine 180 may comprise a storage device, which may include a hard drive, a solid state storage device, a removable storage device, and/or any other suitable storage device. Each of signal acquisition engine 120, storage device 130, external input engine 140, sound engine 150, controller 160, display engine 170, and autoplay engine 180 may be located at any suitable location. Each of signal acquisition engine 120, storage device 130, external input engine 140, sound engine 150, controller 160, display engine 170, and autoplay engine 180 may be implemented as a stand-alone device or integrated with one or more other components of system 100.

The components of the smart piano system that may be used in connection with the present system described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure.

Figure 2A:
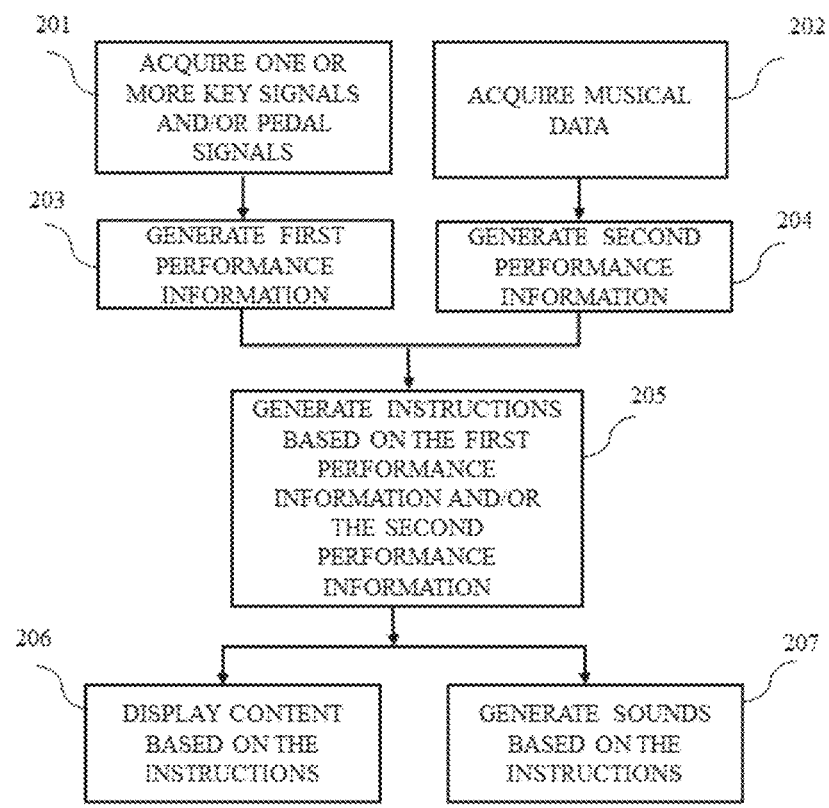
FIGS. 2A and 2B illustrate two exemplary processes for providing a smart piano system according to some embodiments of the present disclosure.

FIG. 2A is a flowchart illustrating a process for providing a piano system according to one embodiment of the present disclosure.

As illustrated in FIG. 2A, in step 201 the smart piano system may acquire one or more key signals and/or pedal signals related to a first performance of a piece of music. The first performance may be a performance of the music by a first user (e.g., a piano student). Each of the key signals may include information about motion of a key. Each of the pedal signals may include information about motion of a pedal of the piano during the performance. The information about motion of a key may include but is not limited to, one or more positions of the key during the first performance, timing information about the motion of the key (e.g., a time instant corresponding to depression of the key, a time instant corresponding to release of the key, a time instant corresponding to a position of the key, etc.), a depression strength, velocities of the key during its motion, and/or numbers of key groups or numbers of each individual key if the key and/or key groups are numbered by the smart piano system. The information regarding the pedal motions may include, but is not limited to, the time player operating on the pedals, and numbers of each individual pedal or numbers of pedal groups if the pedal or pedal groups are numbered by the smart piano system. The key signals and pedal signals of keys/pedals may be obtained by the signal acquisition engine 120 as described in connection with FIGS. 3-12.

In step 202, the smart piano system may acquire musical data related to a second performance of the piece of music. The second performance may be a performance of the piece of music by a second user (e.g., a teacher, a pianist, etc.). In some embodiments, the second performance may represent a sample performance of the piece of music. The musical data may be acquired from the external input engine 140, the storage device 130, and/or any other device. Exemplary musical data may include musical manuscript, one or more musical notes, timing of fingering one or more keys, timing of operating one or more pedals, sequences of fingering one or more keys, and sequences of operating one or more pedals, etc. In some embodiments, the key signals, pedal signals, and the musical data may be acquired sequentially, simultaneously, substantially simultaneously, or in any other manner.

In step 203, the smart piano system can generate first performance information based on one or more of the key signals and/or pedal signals. The first performance information may be generated by several actions, including but not limited to adding indicators of the keys and/or the pedals, producing musical notes, and generating musical manuscripts. In some embodiments, the first performance information may be generated by performing one or more operations described in connection with FIGS. 16 and 18.

In step 204, the smart piano system can generate second performance information based on the musical data. The second performance information may include but is not limited to operating sequence of the keys and/or pedals, indicators of the keys and/or pedals, and musical notes based on the musical data. The key signals, pedal signals and the musical data may be used to reproduce a performance. In some embodiments, the second performance information may be generated by performing one or more operations described in connection with FIGS. 14-15.

In step 205, one or more instructions may be generated based on the first information and/or the second performance information. The instructions may include one or more instructions for implementing one or more modes, such as a teaching mode, a playback mode, a sound compensation mode, an error detection mode, etc.

In some embodiments, the instructions for general display may include presenting operation sequence of the keys and/or pedals, indicators (e.g., symbols to indicate operation sequences of the keys and/or pedals) of the keys and/or pedals, and musical notes in the first performance information and/or the second performance information. The instructions for general sound may include extracting the musical notes in the first performance information and/or the second performance information, and generating sounds based on the musical notes.

In some embodiments, the instructions for sound compensation may include extracting musical notes in the first performance information and/or the second performance information. The instructions for sound compensation may also include adding sounds when certain musical notes are played. For instance, when a G major is played, electric sounds may be produced along with the acoustic sounds. The instructions for sound compensation may further include acquiring information of surrounding environment, and setting compensation parameters. Merely by way of example, the information of surrounding environment may include room size, room structure, and noise, etc. The compensation parameters may be loudness, frequencies, and timbres of sounds, etc.

In some embodiments, the instructions for teaching may include extracting the operating sequence of the keys and/or pedals, the indicators of the keys and/or pedals, and the musical notes in the second performance information. The second performance information may be generated based on a sample performance. The sample performance may be a performance of the piece of music by a teacher, pianist, another player, etc. The instructions for teaching may further include presenting the indicators of the keys and/or pedals, the musical notes in a form of videos or images, and presenting the musical notes in a form of sounds.

In some embodiments, the instructions for error detection may include acquiring the key signals and/or pedals signals in a performance of the player, and generating the first performance information. The instructions for error detection may also include one or more instructions for comparing the first performance information with the second performance information, and detecting errors in the first performance information. The second performance information may be generated based on a standard performance, and/or performances of the player in history. The standard performance may be from a teacher, or an expert, etc. The instructions for error detection may further include generating suggestions for the player after comparing the first performance information with the second performance information. Merely by way of example, the suggestions may be acquired from an expert guidance database after detecting the errors in the first performance information. The suggestions and errors may be presented in a form of videos, images, and/or sounds. For instance, the suggestions may be provided by one or more speakers.

In some embodiments, the instructions for playback may include generating the first performance information in a performance of the player based on key signals and/or pedal signals. The instructions for playback may also include converting the first performance information into the musical data and the second performance information. The instructions for playback may further include presenting the indicators of the keys and/or pedals, the musical notes in a form of videos or images based on the second performance information. The musical notes may be also presented in a form of sounds.

The instructions may be generated by the controller 160. The instructions may be then sent to the display engine 170 and/or the sound engine 150.

In step 206, the smart piano system may display content based on the instructions. The content may relate to the first performance information, the second performance information, the musical data, and/or any other information. In some embodiments, the content can be displayed by performing one or more operations described in connection with FIGS. 18-21G.

In step 207, the smart piano system can generate sounds based on the instructions. For example, acoustic sounds and/or electric sounds can be generated as described in connection with FIGS. 22-26.

Figure 2B:
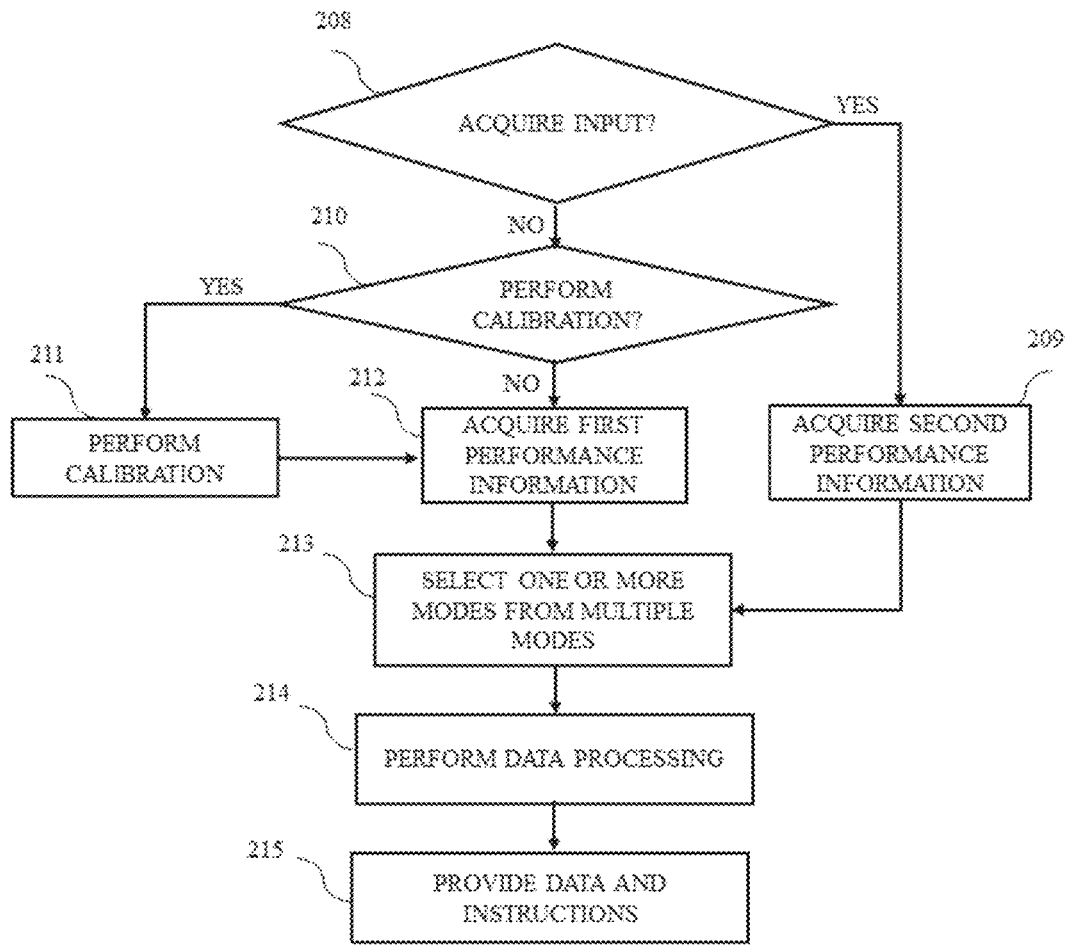

FIG. 2B is a flowchart illustrating a process for providing a piano system according to another embodiment of the present disclosure.

As illustrated in FIG. 2B, in step 208, the smart piano system may determine if an input that initiates the process has been received. The input may correspond to a user request to initiate the process, one or more key signals or pedal signals, musical data, and/or any other input. In some embodiments, the input may be a user request to turn on the smart piano system.

In some embodiments, in response to receiving the input, the smart piano system may generate a command to initiate the process and may proceed to step 209. The input command may be generated by the controller 160.

In step 209, the smart piano system may acquire the second performance information and the process may then go to step 213. The second performance information may be generated based on musical data inputted by the external input engine 140 or the storage device 130. The second performance information may include but not limited to operating sequence of the keys and/or pedals, indicators of the keys and/or pedals, and musical notes produced according to the musical data.

If no input has been received, the smart piano system may proceed to step 210. In step 210, the smart piano system may determine whether the smart piano system is to be calibrated. This determination can be made based on any suitable criterion and/or criteria. For example, the smart piano system may determine that a calibration is to be performed in response to determining that the time interval between the date of the last calibration and the present date reaches a threshold value. The threshold value may be determined based on the life time of key sensors, pedal sensors, data receivers, and any other part of the signal acquisition engine (shown in FIG. 3). As another example, the smart piano system may determine that a calibration is to be performed in response to determining that it is the first time the player uses the smart piano system.

If the calibration is to be performed, the step may go to step 211 and the calibration may be performed. For example, the calibration may be performed by performing one or more operations described in connection with FIG. 9 below.

Alternatively, in response to determining that the calibration is not to be performed, the smart piano system may proceed to step 212 and may acquire the first performance information. The first performance information may be acquired by the signal acquisition engine 120. The first performance information may be acquired based on motions of the keys and the pedals.

The first and the second performance information may be further processed in step 213. In step 213, the smart piano system may select one or more modes from multiple modes of the smart piano system. Exemplary modes include a general display mode, a general sound mode, a sound compensation mode, a teaching mode, an error detection mode, a playback mode, etc. The selection of modes may be based on the input of the player, or content of the first performance information and/or the second performance information. Merely by way of example, the teaching mode may be selected if the player decides to perform the teaching mode. The teaching mode may be also selected if the second performance information represent a standard performance.

In step 214, the smart piano system may perform data processing and generate instructions in step 214. Exemplary data processing may include extracting the operation sequences of the keys and/or the pedals, generating the indicators (e.g., symbols for indicating operation sequences of the keys and/or the pedals) of the keys and/or pedals, and calculating the musical notes in the first and/or second performance information. The instructions may be generated according to each mode to be performed, and the first performance information and/or the second performance information. Generation of instructions is as described in FIG. 2A. Details are omitted for simplicity.

After the data processing, the first performance information, the second performance information, and/or the instructions may be provided by the smart piano system in step 215. The first performance information and/or the second performance information, and the instructions for a mode may be provided to the sound engine 150, the display engine 170, and other part of the smart piano system. Merely by way of example, the display engine 170 may then display videos, images, or any other content to present the first performance information and/or the second performance information. The sound engine 150 may then generate acoustic sounds and/or the electric sounds based on the musical notes in the first performance information and/or the second performance information, and the instructions.

The first and/or the second performance information, and instructions for one mode may be used in other modes. Merely by way of example, the error detection mode may detect errors in the first performance information. The errors and the first performance information may be recorded and used in the playback mode. The playback mode may display the errors, and generate sounds based on the first performance information.

It should be noted that the processes described above is provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Figure 3:
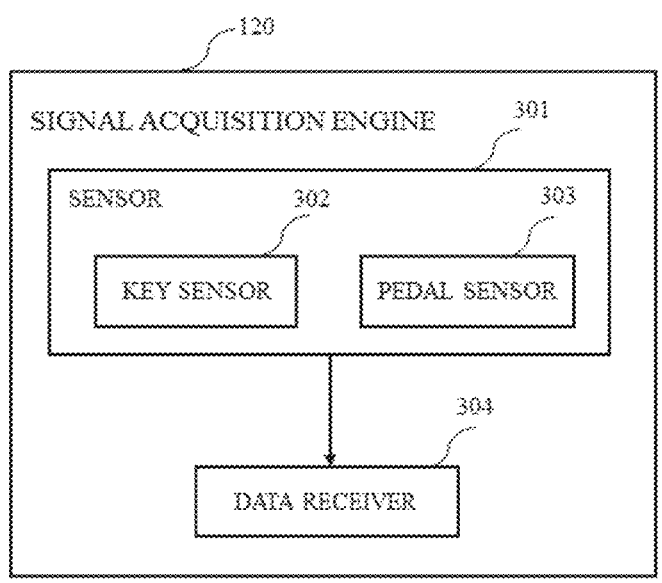
FIG. 3 illustrates an example of a signal acquisition engine according to some embodiments of the present disclosure.

FIG. 3 illustrates an example of a signal acquisition engine according to some embodiments of the present disclosure. As shown in FIG. 3, signal acquisition engine 120 may include one or more sensors 301, data receivers 304, and/or any other component for acquiring, processing, transmitting, storing, etc. signals for a smart piano system. More or less components may be included in signal acquisition engine 120 without loss of generality. For example, two of the modules may be combined into a single module, or one of the modules may be divided into two or more modules. In one implementation, one or more of the modules may reside on different computing devices (e.g., desktops, laptops, mobile phones, tablet computers, wearable computing devices, etc.). In some embodiments, the signal acquisition engine of FIG. 3 may be and/or include signal acquisition engine 120 as described above in connection with FIG. 1.

Each of the sensors 301 may be configured to detect motions of one or more keys, pedals, and/or any other component of a piano (e.g., the piano 110 of FIG. 1) during a performance of a player. Each of the sensors 301 may be and/or include any sensor that is capable of detecting information about motions of a component of a piano (e.g., one or more keys, pedals, etc.). For example, each of the sensors 301 can be and/or include an opto-electric sensor, a magneto-electric sensor, a piezo-electric, an angle sensor, a Hall sensor, a grating sensor, a potentiometer, an encoder, a TACT switch, a limit switch, the like, or any combination thereof. In some embodiments, the sensors 301 may include one or more key sensors 302, pedal sensors 303, etc. Each of the key sensors 302 can detect information about motion of one or more piano keys and can generate one or more signals including such information (also referred to herein as the "key signals"). Information about motion of a key may include but is not limited to, one or more positions of the key, timing information about the motion of the key (e.g., a time instant corresponding to depression of the key, a time instant corresponding to release of the key, a time instant corresponding to a position of the key, etc.), a depression strength, velocities of the key during its motion, and/or numbers of key groups or numbers of each individual key if the key groups or the keys are numbered by the smart piano system. Each of the key group may include one or more keys. Each of the pedal sensors 303 can detect information about movements of one or more pedals of a piano and can generate one or more signals including such information (also referred to herein as the "pedal signals"). Information about motion of a pedal may include, but are not limited to, one or more positions of the pedal, timing information about the motion of the pedal (e.g., a time instant corresponding to operation of the pedal, a time instant corresponding to a position of the key, etc.), velocities of the pedal during its motion, and/or numbers of each individual pedal or numbers of pedal groups if the pedals or the pedal groups are numbered by the smart piano system. Each of the pedal group may include one or more pedals. In some embodiments, a key signal and/or a pedal signal can be an electric signal, such as a current signal, a voltage signal, etc. After acquiring one or more key signals and/or pedal signals via the sensors 301, signal acquisition engine 120 can transmit one or more of key signals and/or pedal signals to the controller 160, the storage device 130, and/or any other device.

In some embodiments, the data receivers 304 may determine whether values of a signal (e.g., a key signal, a pedal signal, etc.) generated by a sensor 301 reach a threshold. If a value of the signal reaches the threshold (e.g., being equal to or greater than the threshold), the data receivers 304 may record the value of the signal. The value of the signal may correspond to one or more positions of the key, timing information about the motion of the key (e.g., a time instant corresponding to depression of the key, a time instant corresponding to release of the key, a time instant corresponding to a position of the key, etc.), a depression strength, velocities of the key during its motion, and/or numbers of key groups or numbers of each individual key if the key groups or the keys are numbered by the smart piano system. The data receivers 304 may also transmit the signal and/or the value of the signal to the controller 160 or any other device. In some embodiments, multiple key signals and/or pedal signals may be transmitted sequentially, simultaneously, substantially simultaneously, or in any other manner.

The signal acquisition engine described herein is not exhaustive and not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure.

Figure 4A:
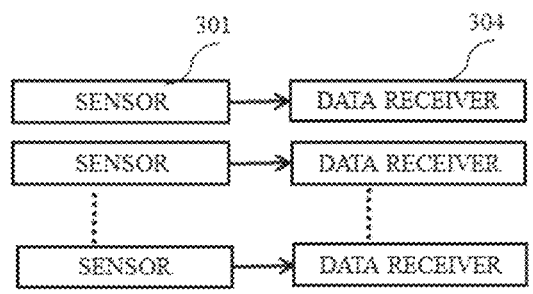
FIGS. 4A though 4C illustrate different types of coupling between sensors and data receivers according to some embodiments of the present disclosure.
Figure 4B:
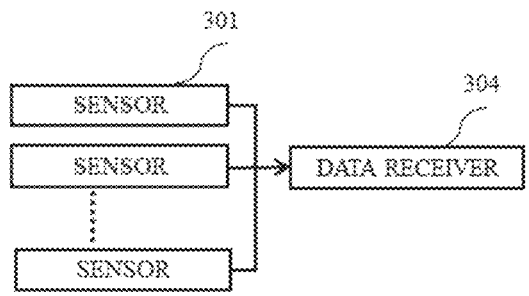
Figure 4C:
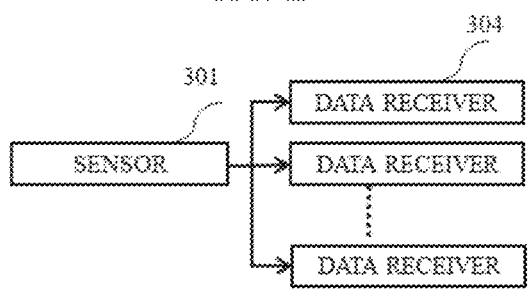

FIGS. 4A though 4C illustrate different types of coupling between sensors and data receivers according to some embodiments of the present disclosure. FIG. 4A shows that one sensor 301 may be coupled to one data receiver 304. As shown in FIG. 4A, each data receiver 304 may individually connect to or communicate with one sensor 301 and receive key/pedal information from it. The one-to-one coupling of the sensor 301 and the data receiver 304 may decrease the crosstalk between each sensor-data receiver pair. FIG. 4B illustrates that a plurality of sensors 301 may be coupled to one data receiver 304. As shown in FIG. 4B, a plurality of sensors 301 may be coupled with one data receiver 304. The data receiver 304 may scan total or partial of all sensors and determine whether the signals obtained by the scanned sensors may be recorded and transmitted. FIG. 4C illustrates that one sensor 301 may be coupled to multiple data receivers 304. As shown in FIG. 4C, the signals acquired by one sensor 301 may be optionally received by a plurality of data receivers 304. Though not shown in FIG. 4C, the signals acquired by other sensors may be also received by these data receivers. Therefore, the sensors may be optionally transfer the acquired signals to any data receiver. Thus, deterioration of the function of one or more data receiver may not compromise the signal acquisition process.

The sensors and data receivers described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure.

Figure 5A:
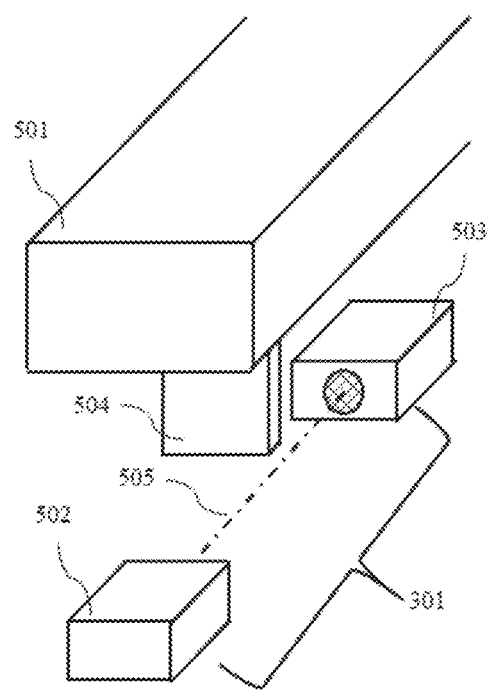
FIGS. 5A and 5B illustrate an opto-electric sensor according to some embodiments of the present disclosure.
Figure 5B:
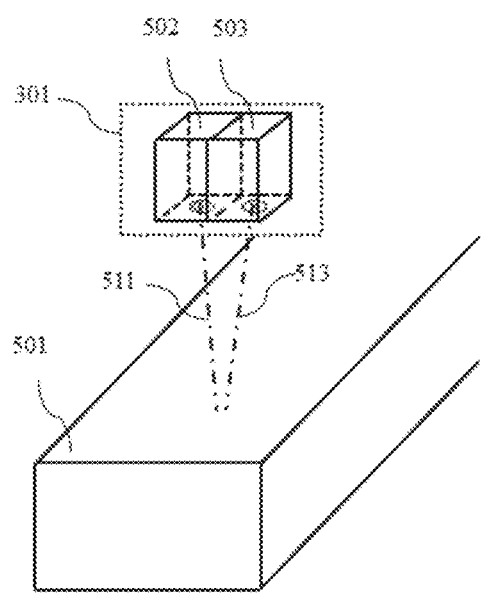

Turning to FIGS. 5A and 5B, mechanisms for detecting motions of a key of a piano using a sensor in accordance with some embodiments of the disclosure is illustrated. As shown, a sensor 301 (e.g., an opto-electric sensor) may include a light-emitting element 502 and a light-detecting element 503. An exemplary list of the light-emitting element 502 may include visible LED, laser LED, infrared LED, laser diode (LD), photocell, etc. An exemplary list of the light-detecting element 503 may include phototube, active-pixel sensor (APS), bolometer, charge-coupled device (CCD), gaseous ionization detector, photoresistor, phototransistor, etc. The light-emitting element 502 may generate light of various wavelengths. For example, the light-emitting element 502 may generate visible light, infrared light, ultraviolet (UV) light, etc. In some embodiments, the wavelength of a beam of light emitted by the light-emitting element 502 may be controlled by one or more motors using a Pulse Width Modulation (PWM) mechanism. The light-detecting element 503 may be configured to receive the light and to convert it into an electronic signal (e.g., a current signal, a voltage signal, etc.).

Referring to FIG. 5A, in some embodiments, the light-emitting element 502 and the light-detecting element 503 may be positioned under the key 501. In some embodiments, the key 501 may be coupled to a non-transparent plate 504. The non-transparent plate 504 may partially or completely prevent the light-detecting element 503 from receiving the light emitted by the light-emitting element 502. The non-transparent plate 504 may be coupled to a surface of the key 501 (e.g., the bottom of the key 501). The light-emitting element 502 may constantly emit light towards the light-detecting element 503. The light-emitting element 502 may also discontinuously emit light towards the light-detecting element 503. For instance, there may be one or more time intervals between light emissions. The one or more time intervals may be based on velocity of the player depressing the keys.

In some embodiments, a light beam 505 may be emitted by the light-emitting element 502. When the key 501 is not pressed down, the key stays at a "top" position. When a player presses the key 501, the key may move downwards from the "top" position. When the key 501 does not go further, it reaches an "end" position. The non-transparent plate 504 may move along with the key 501 and may block one or more portions of the light beam 505. The amount of the light detected by the light-detecting element 503 may vary due to the movement of the non-transparent plate 504.

For example, when the key 501 moves toward the "end" position, the amount of light detected by the light-detecting element 503 may decrease. As another example, when the key 501 moves toward the "top" position, the amount of light detected by the light-detecting element 503 may increase. The light-detecting element 503 can determine information about the amount of the received light over time and can convert such information into one or more electronic signals (e.g., one or more key signals).

Turning to FIG. 5B, in some embodiments, the non-transparent plate 504 may be omitted from the smart piano system. For instance, the light-emitting element 502 and the light-detecting element 503 may be placed above or beneath the key 501, and the light beam 511 emitted by the light-emitting element 502 may not be able to travel linearly towards the light-detecting element 503. A light beam 511 emitted by the light-emitting element 502 may be projected towards the key 501. The light beam 511 may be reflected by the key 501 once it reaches a surface of the key 501 (e.g., the upper surface, the bottom surface, etc.). The reflected light 513 may then travel towards the light-detecting element 503 and may be received by the light-detecting element 503. When a player presses the key 501, the key may move downwards from the "top" position to the "end" position. The distance that the light travels from the light-emitting element 502 to the light-detecting element 503 may vary due to various motions of the key. The light-detecting element 503 may determine the time between light emission and light reception to record the change in distance that the light travels. The change in distance may be converted into one or more electric signals by the light-detecting element 503. Thus, the motions of the key may be recorded by the sensor 301.

The light-emitting elements and the light-detecting elements described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure.

Figure 6:
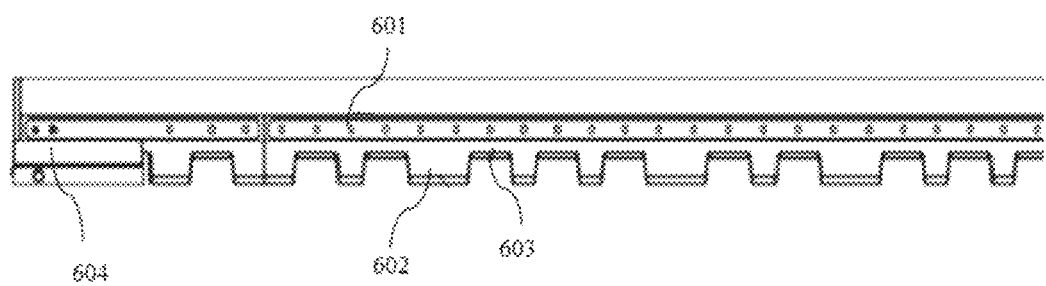
FIG. 6 illustrates configuration of sensor-data receiver pairs according to some embodiments of the present disclosure.

FIG. 6 illustrates configuration of sensor-data receiver pairs according to some embodiments of the present disclosure. As shown in FIG. 6, a first sensor-data receiver pair 602 and a second sensor-data receiver pair 603 may be positioned differently. The first sensor-data receiver pair 602 may be positioned closer to the keyboard than the second sensor-data receiver pair 603. Thus, signals obtained by two sensor-data receiver pairs may have different baseline values. In some embodiments, the different baseline values may be set between the white keys and the black keys. Thus, the smart piano system may distinguish the white and the black keys. In some embodiments, the different baseline values may be used to distinguish several groups of keys. Merely by way of example, the baseline value of a combination of keys may be different if the combination of keys is designed to perform certain system functions.

In a preferred embodiment, as shown in FIG. 6, the sensor-data receiver pairs 602 and 603 may be installed on a test lever 604. The test lever 604 may also be equipped with a LED array 601. The LED array 601 may be used to indicate the key to be depressed. A player may then depress the corresponding key. In some embodiments, the LED may be double-colored. The double-colored LED array 601 may be served as key indicators. The double-colored LED array 601 may be configured to distinguish black keys and white keys.

Figure 7A:
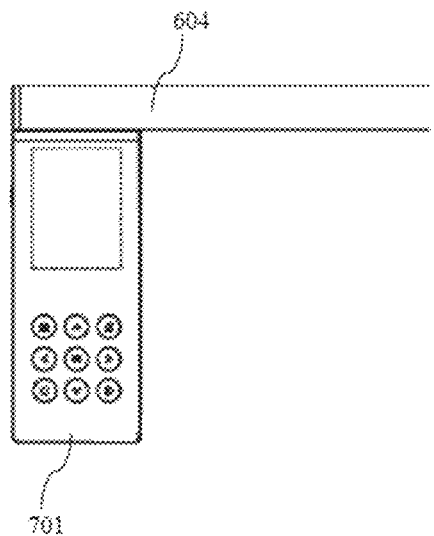
FIG. 7A illustrates configuration of a test lever and an interface according to some embodiments of the present disclosure.

FIG. 7A illustrates configuration of a test lever and an interface according to some embodiments of the present disclosure. As shown in FIG. 7A, the test lever 604 may be coupled to an interface 701. The test lever 604 as described previously may comprise a LED array and sensor-data receiver pairs. One end of the test lever 604 may be attached to the interface 701. The interface 701 may be capable of performing multiple tasks. In some embodiments, the interface 701 may acquire settings from the player. In some embodiments, the interface 701 may acquire musical data via the external input engine 140 or the storage device 130. In some embodiments, the interface 701 may display instructions generated by the controller 160.

Figure 7B:
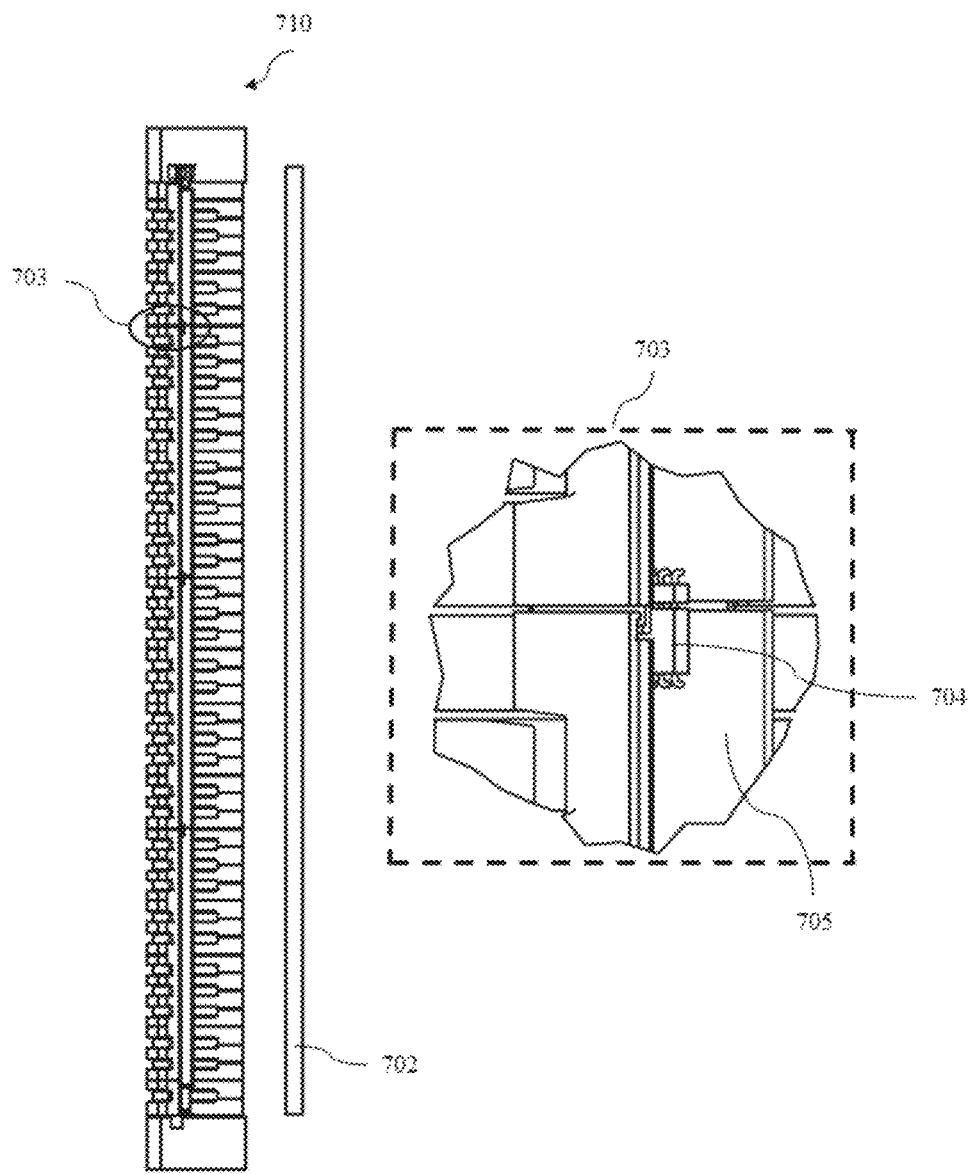
FIGS. 7B and 7C illustrate configuration of an adaptor according to some embodiments of the present disclosure.
Figure 7C:
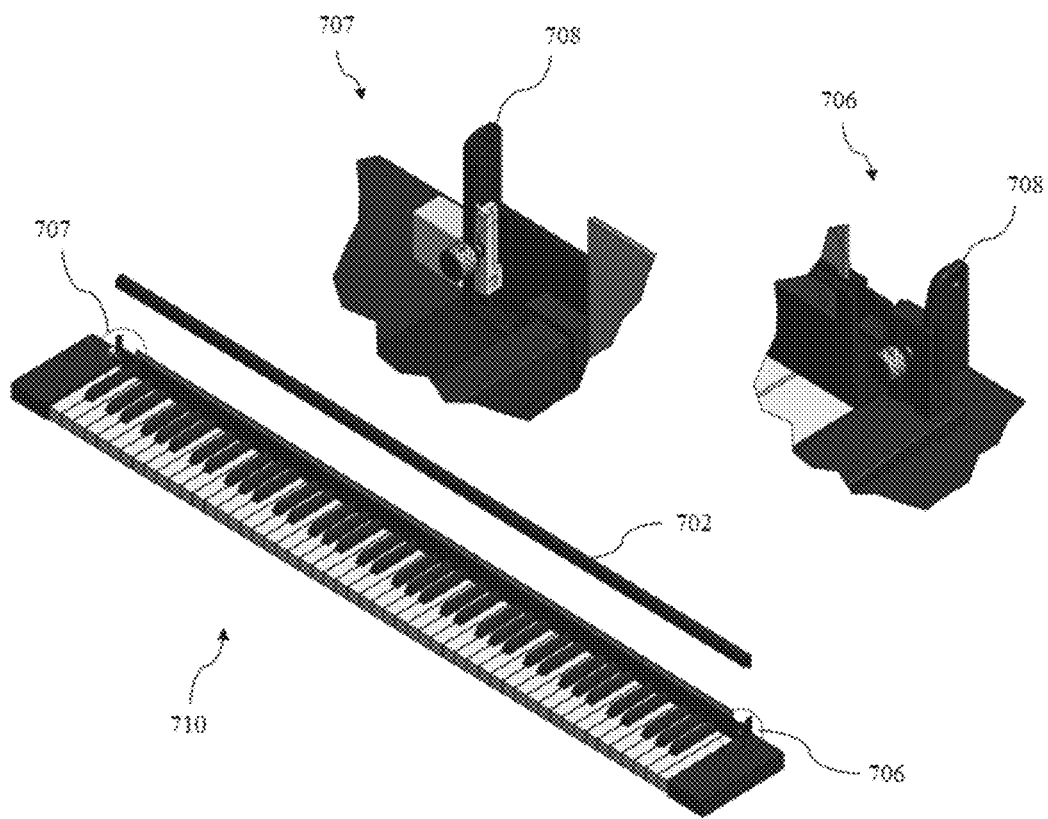

FIGS. 7B and 7C illustrate examples of configuration of an adaptor according to some embodiments of the present disclosure. The adaptor 710 may be used to connect one or more substrates to a piano (as described in connection with FIG. 1). The one or more substrates may include the signal acquisition engine 120, the storage device 130, the external input engine 140, the controller 160, the sound engine 150, the display engine 170, and/or any other part of the smart piano system (e.g., one or more components as described in connection with FIG. 1).

In some embodiments, as shown in FIGS. 7B and 7C, the adaptor 710 may be used to connect the smart piano system (not shown in FIGS. 7B and 7C) with a keyboard. The signal acquisition engine 120 and/or any other part of the smart piano system may be installed on the adaptor. The adaptor 710 may include one or more levers 702 and one or more connector units 703. The lever(s) 702 may be coupled to the signal acquisition engine 120 and/or any other part of the smart piano system. The lever(s) 702 may be made of conductive materials (e.g., aluminum, copper, or alloy, etc.) and/or nonconductive materials (e.g., plastics). The connector unit(s) 703 may be used to connect the adaptor to the keyboard. The one or more connector unit(s) 703 may also be coupled to one or more levers 702. The connector unit(s) 703 may be installed on the keyboard and can move in any direction. For example, the connector unit(s) 703 may move in a direction perpendicular to one or more keys of the keyboard for a predefined arrange of distance (e.g., a distance equal to length of one black key, a distance equal to one third of length of the keyboard, etc.). The connector unit 703 may further include one or more connectors 704, one or more supporting plates 705, and/or any other component for implementing the connector unit 703. The supporting plates 705 may be connected to the signal acquisition engine 120. The supporting plates 705 may also be coupled to the controller 160, the display engine 170, and/or any other part of the smart piano system.

In some embodiments, as shown in FIG. 7B, the length of the adaptor 710 may be adjusted by one or more connectors 704. The length of the adaptor may be adjusted according to various characteristics of the keyboard (e.g., the size of the keyboard, the type of the keyboard, etc.) and/or the substrates. For example, piano keyboards with various sizes (e.g., keys of different widths) may have the same number of keys (e.g., 88 keys). The length of the adaptor 710 may be adjusted based on such variations in sizes of the keyboards (e.g., by adjusting one or more connector units). In a more particular example, the sizes of different keyboards may fall within a range (e.g., a range between 0 to 8 millimeters). In such example, the length of the adaptor 710 may be adjusted within the range by adjusting one or more connector units 703. In a more particular example, multiple connector units 703 (e.g., four connector units 703) may be used and each of the connector units 703 may extend to a contain length (e.g., about 2 millimeters or any other length) to enable the adaptor to be adjusted within the range. In some embodiments, the length of the connector units 703 may be adjusted by changing length of gap between two supporting plates 705. In such embodiments, the connectors 704 may include one or more printed circuit board connectors (PCB) to adjust the length of the gap between two supporting plates 705. The two supporting plates 705 may include one or more supporting structures for connecting one or more keys to the adaptor 710. The supporting structures may include wedge-shape structures, convex-concave structures, and/or any other suitable structures for connecting one or more keys to the adaptor 710. In some embodiments, a convex-concave structure and a black key may form a conjunction surface to give mechanical forces to make the adaptor 710 closer to a surface of the black key.

In some embodiments, as shown in FIG. 7C, the height of the adaptor 710 may be adjusted by one or more fastener devices. As shown in FIG. 7C, two fastener devices 706 and 707 may be installed on opposite sides of the adaptor 710. The fastener devices may include one or more screws, one or more rotary knobs, and/or any other component for fastening the lever 702. The height of the lever 702 may be adjusted by pulling up or down the lever 702 in a direction parallel to one or more supporting levels 708.

It should be noted that the sensors, the data receivers, and the adaptor described above are provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Figure 8:
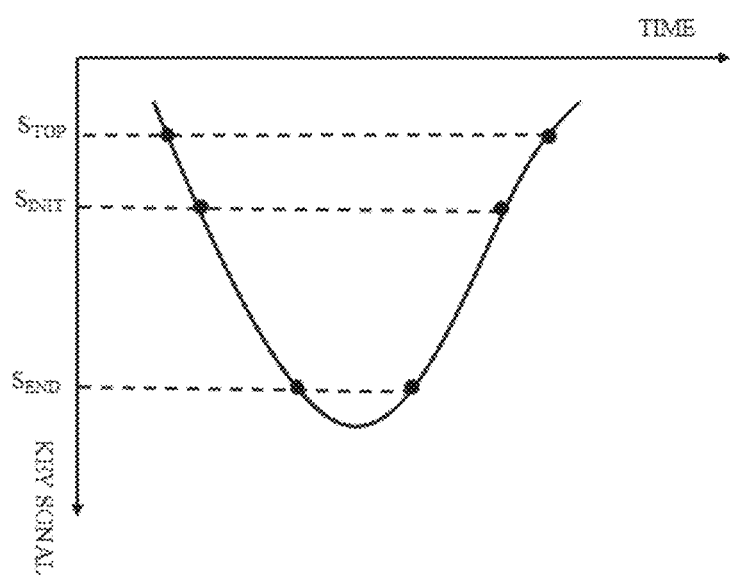
FIG. 8 illustrates a key signal corresponding to a trajectory of a piano key according to some embodiments of the present disclosure.

FIG. 8 illustrates a key signal corresponding to a trajectory of a piano key according to some embodiments of the present disclosure. The key signal may be generated based on one or more mechanisms described in conjunction with FIGS. 5A-5B above. As described above, the key may stay at a "top" position if no force is exerted on the key. When a player presses the key, the key may move downwards along with a finger of the player. When the key does not go further (e.g., when the player starts releasing the key), the key may reach an "end" position. After the key is released by the player, the key moves upwards to the "top" position. Thus, in the whole trajectory, the key moves downwards from the "top" position to the end position, and after the key reaches the end position, the key moves upwards to the "top" position.

The key signals may be acquired during the whole trajectory. Various values of the key signal may correspond to different positions of the key in the trajectory. As shown in FIG. 8, during the movement of the key from the "top" position to the "end" position, the values of the key signal may increase. Similarly, during the movement of the key from the "end" position to the "top" position, the values of the key signal may decrease.

One or more thresholds may be used to determine positional information of the key. Any suitable number of thresholds may be set to determine positional information of the key. For example, as will be discussed in more detail in conjunction with FIGS. 8 and 11, multiple thresholds may be set to determine whether the key is at various positions. In some embodiments, each of the thresholds may correspond to a position of the key (e.g., the "top" position, the "end" position, a position located between the "top" position and the "end" position, etc.). As shown in FIG. 8, during the whole trajectory, the value of the key signal indicates the key may be located at two possible positions, which means the key may either be depressed towards the "end" position, or be released from the "end" position. In an embodiment illustrated in FIG. 8, when the key reaches a position represented by a threshold, the key signal may be acquired, and the value of key signal and the threshold may be the same. The key may keep moving. When the keys reaches a next position, the key signal S may be acquired. If the value of the key signal S is greater than the threshold, it indicates the key has passed the position represented by the threshold and is currently moving to the "end" position. If the value of the key signal S is smaller than the threshold, it indicates the key has passed the position represented by the threshold and is currently moving to the "top" position. Thus, the position of the key may be determined.

In some embodiments, the smart piano system may set three thresholds. As shown in FIG. 8, a first threshold $S_{INIT}$ may be set based on a key signal obtained near the "top" position to determine if the key is depressed. A second threshold $S_{END}$ may be set based on a value of the key signal obtained near the end position to determine if the key reaches the end position. A third threshold $S_{TOP}$ may be set based on key signal obtained at a time interval T after the key is released from the end position. The time interval T may be set empirically. In some embodiments, the time interval T may be set as two seconds. The calibration of the sensors may be performed to accurately acquire signals of corresponding keys. In some embodiments, the calibration may be achieved by adjusting PWM values when the light emitting elements of the sensors are controlled by motors driven by a PWM mechanism. In some embodiments, the values of "$S_{INIT}$," "$S_{END}$," and "$S_{TOP}$" may be determined by performing one or more operations described in conjunction with FIG. 9.

Figure 9:
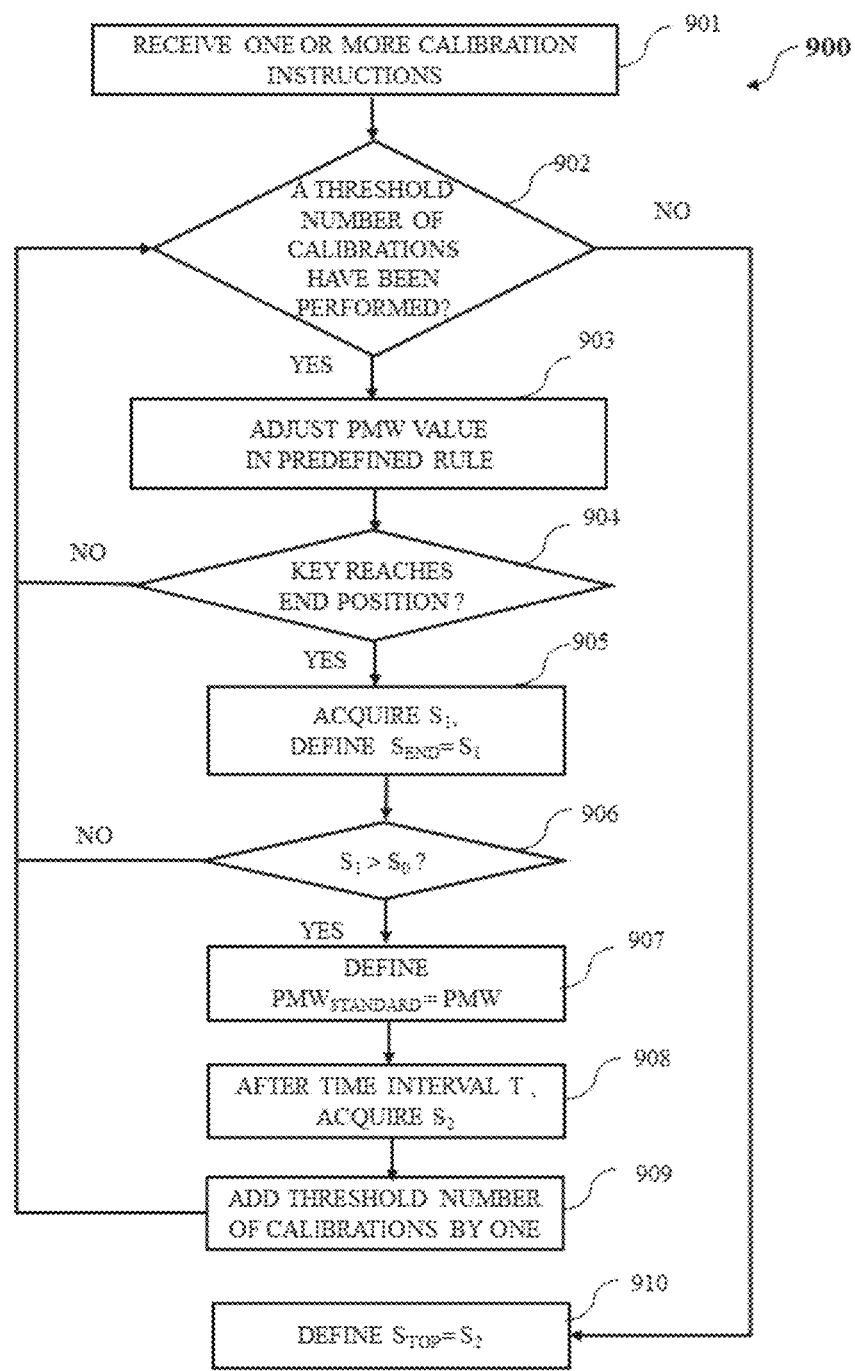
FIG. 9 is a flowchart illustrating an example of a process for calibrating one or more sensors of a smart piano system according to some embodiments of the present disclosure.

FIG. 9 is a flowchart illustrating an example 900 of a process for calibrating one or more sensors of a smart piano system according to some embodiments of the present disclosure. The calibration may be performed when a player first uses the smart piano system. In some embodiments, the player may initiate the calibration by providing one or more user inputs. For instance, if the player decides to perform the calibration at any time he wants, the smart piano system may acquire one or more user inputs and initiate the calibration. Alternatively or additionally, the smart piano system may automatically initiate the calibration at first use. The smart piano system may also perform the calibration periodically based on conditions of the signal acquisition engine (e.g., slow deterioration of the sensors, the data receiver, and/or any other part of the signal acquisition engine). The smart piano system may also perform the calibration based on frequency of usage in a period of time, number of errors in one or more performances, etc. For example, if the player uses the smart piano system for a threshold number of times, the smart piano system may perform the calibration. The smart piano system may also detect the errors of the player in one or more performances and determine if a threshold number of errors have been generated. If the threshold number of errors have been generated, the smart piano system may initiate the calibration.

Process 900 may be performed by processing logic that comprises hardware (e.g., circuitry, dedicated logic, programmable logic, microcode, etc.), software (e.g., instructions run on a processing device to perform hardware simulation), or a combination thereof. In some implementations, process 900 may be performed by a processing device 105 as described above in connection with FIG. 1.

As shown, process 900 can start by receiving one or more calibration instructions in step 901. The calibration instruction(s) may be generated based on one or more user inputs, instructions provided by a controller (e.g., controller 160 of FIG. 1), and/or any other information. In some embodiments, the calibration instruction(s) can include one or more instructions that indicate a user request to initiate the calibration process. The calibration instruction(s) may also include one or more instructions that indicate the conditions of the signal acquisition engine, a frequency of usage, the number of errors in one or more performances, etc.

In step 902, process 900 may determine whether a threshold number of calibrations have been performed. The threshold number of calibrations may be determined based on the number of the keys of the piano, the number of the sensors to be calibrated, the number of groups of sensors to be calibrated, the sequential order in which the sensors and/or group of sensors are calibrated, and/or any other information about the piano and/or the calibration(s) to be performed. For example, the threshold number of calibrations may be the same as the number of the keys when each of the sensors corresponds to a key and/or when each of the sensors is calibrated individually. As another example, in some embodiments in which the sensors are divided into several groups, the threshold number of calibrations may be the number of the groups. Multiple groups of sensors may be calibrated sequentially, in parallel, and/or in any other manner. In a particular example, when the piano is equipped with 88 sensors and the 88 sensors are divided into four groups, the threshold number of calibrations may be 4. In a more particular example, each of a first group, a second group, and a third group of sensors may include 24 key sensors and a fourth group of sensors may include 16 key sensors. In an exemplary calibration process described in FIG. 9, the predetermined threshold number of calibrations may be 88 and each 88 sensor may be calibrated separately.

In some embodiments, process 900 may proceed to step 910 in response to determining that the threshold number of calibrations have been performed.

Alternatively, in response to determining that the threshold of calibrations have not been performed, process 900 may proceed to step 903. In step 903, process 900 may adjust one or more PWM values corresponding to a first sensor and/or a first group of sensors. For example, the PWM values may be adjusted till difference of the key signals between white keys and black keys reaches certain values. As the white keys and black keys may produce musical notes that are a half-step apart, the PWM values may be adjusted to distinguish the white keys and black keys. After adjusting the PWM values, the white/black key may be depressed towards the end position.

In step 904, process 900 may determine if the key reaches an "end" position. For example, process 900 may determine that the key has reached the end position in response to detecting a certain value of the key signal (e.g., a maximum value, a minimum value, or any other value detected during a period of time).

In some embodiments, process 900 may loop back to step 902 in response to determining that the key has not reached the "end" position. If the key has not reached the "end" position, a reference value $S_{END}$ (as described in connection with FIG. 8) may not be established. The key may be depressed again before step 904 and be determined if the key has reached the "end" position in step 904.

In some embodiments, in response to determining that the key has reached the "end" position, process 900 may proceed to step 905. In step 905, process 900 can determine a first threshold value based on a first value of the key signal. The first value of the key signal may correspond to a first time instant (e.g., when the key reaches the "end" position, a time instant prior to or after the detection of the "end" position, etc.). In some embodiments, the first value may represent a reference value that may be used to determine whether the key is at the "end" position (e.g., "$S_{END}$" as described in connection with FIG. 8).

In step 906, process 900 can determine whether the first value of the key signal $S_1$ exceeds a predefined value. If the first value of the key signal $S_1$ exceeds the predefined value (e.g., "$S_0$"), the process may proceed to step 907. Alternatively, process 900 may loop back to step 902 in response to determining that the first value of the key signal does not exceed the predefined value. The predefined value $S_0$ may be defined empirically. In some embodiments, the predefined value may be defined according to results of several tests performed on the piano 110 before the calibration. The tests may be performed by depressing each key to the "end" position one or more times, and recording values of key signals. The values of key signals may be used as reference to the predefined value $S_0$. For instance, average of key signals in one or more test may be defined as predefined value $S_0$.

In step 907, the PWM value of the sensor may be recorded as a standard PWM value of this sensor. Then the key may be released from the end position.

In step 908, process 900 can acquire a second value of the key signal S2. The second value may be acquired at a second time instant. The first time instant and the second time instant may constitute a predetermined time interval, such as one second, a few seconds (e.g., two seconds), and/or any other suitable period of time.

In step 909, the number of calibrations having been performed may be incremented by a step. The step may have any value, such as "1," "2," etc. The current calibration may be regarded as having been completed in step 909. Process 900 may loop back to step 902 to perform a next calibration. For example, the smart piano system may skip the calibration of one or more newly installed sensors. The smart piano system may calibrate some sensors more than once. For instance, the smart piano system may detect deterioration conditions of some sensors and calibrate the sensors suffering from functional deterioration more than once.

Upon completing the threshold number of calibrations (e.g., "NO" at block 902), process 900 may proceed to step 910. In step 910, process 900 may define a second threshold based on the second value of the key signal S2. The second threshold may be a reference value that can be used to determine whether the key is at the "top" position (e.g., a value of "$S_{TOP}$" as described in connection with FIG. 8 above).

Figure 10:
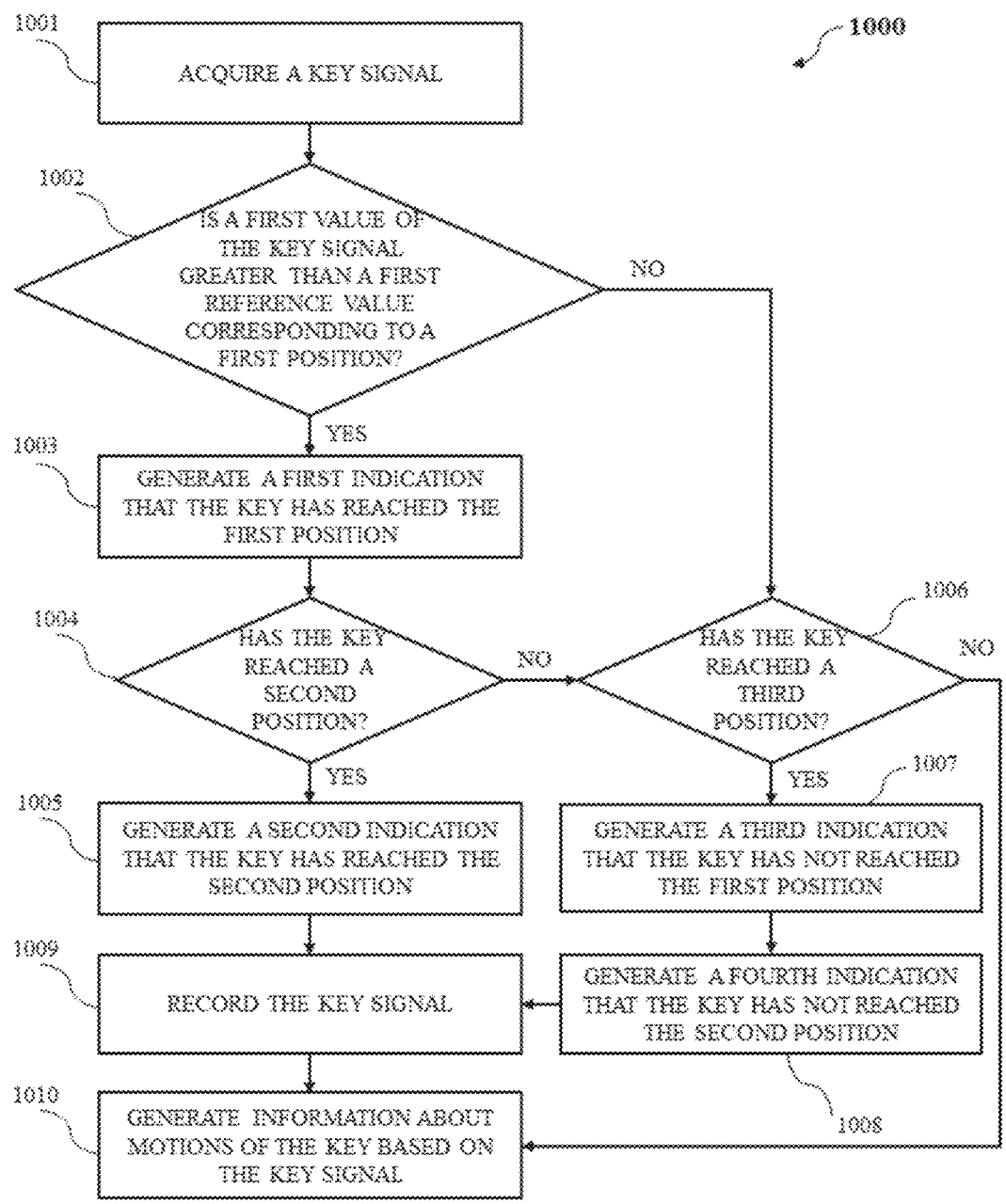
FIG. 10 is a flowchart illustrating an exemplary process for acquiring key signal according to some embodiments of the present disclosure.

FIG. 10 is a flowchart illustrating an exemplary process 1000 for processing key signals representative of motions of a piano key according to some embodiments of the present disclosure. Process 1000 may be used to acquire information about motions of the piano key.

Process 1000 may be performed by processing logic that comprises hardware (e.g., circuitry, dedicated logic, programmable logic, microcode, etc.), software (e.g., instructions run on a processing device to perform hardware simulation), or a combination thereof. In some implementations, process 1000 may be performed by a processing device 105 as described above in connection with FIG. 1.

As shown, the process 1000 may start by acquiring a key signal in step 1001. The key signal may be acquired by the signal acquisition engine 120. Various values of the signal may be sampled over time randomly, periodically, etc. The values may be sampled at any suitable sampling rate.

In some embodiments, process 1000 may also start a timer to record timing information about the key signal. For example, the timer may be used to track and record one or more time instants corresponding to one or more values of the key signals, time intervals corresponding to one or more values of the key signals, and/or any other timing information about the key signal. More particularly, for example, the timer may be used track and record a period of time during which the key moves between the "top" position and the "end" position (e.g., $T_{TOP\_TO\_END}$ as described in connection with step 1005). During this period of time, the key signals may be acquired by one or more sensors. And the key signal S may be also updated in one or more steps.

In step 1002, process 1000 may determine whether a first value of the key signal exceeds a first reference value corresponding to a first position of the key. The first value of the key signal may be obtained at a first time instant. The first position may be a position located between the "top" position and the "end" position. For example, the first reference value may be the value $S_{INT}$ as described in connection with FIG. 8 above. In some embodiments, process 1000 may determine that the first value of the key signal exceeds the first reference value in response to determining that the first value of the key signal is greater than the first reference value.

In some embodiments, in response to determining that the first value of the key signal is greater than the first reference value (e.g., "YES" in step 1002), process 1000 can determine that the key is located at a position between the first position and a second position (e.g., the "end" position). Process 1000 may also proceed to step 1003. Alternatively, in response to determining that the first value of the key signal is greater than the first reference value (e.g., "NO" in step 1002), process 1000 may go to step 1007. Process 1000 may further determine whether the key has not been depressed, or whether the key is released and moves back to the "top" position.

In step 1003, process 1000 may generate a first indication that the key is located at a position between the first position and the second position. The first indication may include any suitable data that can indicate whether the key is located at a position between the first position and the second position. For example, the first indication may be and/or include a numerical value, a bit (e.g., "0" or "1"), and/or any other value. As another example, the first indication may be and/or include logical data (e.g., "true" or "false"). In some embodiments, the first indication may be a flag including one or more bits (also referred as the first flag). The value of the first flag may be changed from zero to one in step 1003 if the first value of the key signal is greater than the first reference value. The first indication may be stored in any suitable device.

In step 1004, process 1000 can determine whether the key has reached the second position. For example, process 1000 can acquire a second value of the key signal at a second time instant. Process 1000 can then determine whether the second value of the key signal exceeds the value of a second reference value corresponding to the second position (e.g., "$S_{END}$" as described in connection with FIG. 8 above). In response to determining that the second value of the key signal is greater than the second reference value, process 1000 can determine that the key has reached the "end" position at the second time instant. Process 1000 can also proceed to step 1005 and can generate a second indication that the key has reached the second position. The second indication may include any suitable data that can indicate whether the key has reached the second position. For example, the second indication may be and/or include a numerical value, a bit (e.g., "0" or "1"), and/or any other value. As another example, the second indication may be and/or include logical data (e.g., "true" or "false"). In some embodiments, the second indication may be a flag including one or more bits (also referred as the second flag). The value of the second flag may be set to one in step 1004 if the key has reached the second position. The second indication may be stored in any suitable device.

Alternatively, in response to determining that the key has not reached the second position (e.g., "NO" in step 1004), process 1000 can determine that the key has not reached the second position or that the key may be released from the second position. Process 1000 may also proceed to step 1006.

In step 1006, process 1000 may determine whether the key has reached a third position (e.g., the "top" position). For example, process 1000 can acquire a third value of the key signal and can determine if the third value of the key signal is not greater than a third reference value corresponding to the third position. The third reference value may be the value "$S_{TOP}$" as described in connection with FIG. 8 above. Process 1000 may also determine whether the first indication indicates that the key has reached the first position and/or whether the second indication indicates that the key has reached the third position. For example, process 100 can determine whether the values of the first flag and the second value are both "1." In some embodiments, process 100 may determine that the key has reached the third position in response to determining that the third value of the key signal is not greater than the third reference value and detecting the first indication and the second indication. More particularly, for example, process 1000 can determine that the key has reached the second position (e.g., the "end" position) previously and has passed the third position. Process 1000 may also go to step 1007.

In some embodiments, in response to determining that the third value of the key signal is equal to or greater than the third reference value, process 1000 may further determine positional information about the key based on the first indication and/or the second indication. For example, in response to that the first indication indicates that the key has reached the first position and that the second indication indicates that the key has not reached the second position, process 1000 may determine that the key has been depressed but has not reached the third position (e.g., the "end" position). As another example, in response to determining that the first indication indicates that the key has not reached the first position and that the second indication indicates that the key has reached the second position, process 1000 can determine that the key was released from the third position and currently stays at the first position (e.g., the "top" position). As still another example, responsive to a failure to detecting the first indication and the second indication (e.g., upon determining that the values of the first flag and the second flag are "0"), process 1000 may determine that the key was not depressed and currently stays at the "top" position. Process 1000 may go to step 1010 in response to determining that the key has not reached the third position (e.g., "NO" at 1006).

In step 1007, process 1000 can generate a third indication that the key has not reached the first position. For example, the third indication can be generated by setting the value of the first flag to "0".

In step 1008, process 1000 can generate a fourth indication that the key has not reached the second position. For example, the fourth indication can be generated by setting the value of the second flag to "0".

In step 1009, information about the key signal may be determined and/or stored. For example, one or values of the key signal (the first value, the second value, the third value of the key signal, etc.) may be determined/or stored. As another example, process 1000 can determine, process, and/or store timing information about the key signal, such as the first time instant, the second time instant, the third time instant, one or more time intervals (e.g., a time interval between multiple time instants), etc. In a more particular example, process 1000 can determine a period of time during which the key moves between the first position and the second position, for example, by determining a time interval between the first time instant and the second time instant.

In step 1010, the key signals, the first and second flag value, $T_{TOP\_TO\_END}$ may be sent to the smart piano system for processing. Merely by way of example, the processing exemplified in step 1008 may include determining positions of the key, calculating depressing velocity of the key, calculating depressing strength, etc.

In some embodiments, process 1000 can be performed iteratively. For example, upon performing step 1010, process 1000 can loop back to block 1001. In some embodiments, process 100 can conclude in response to receiving an instruction for concluding the process (e.g., a break signal, etc.).

Figure 11:
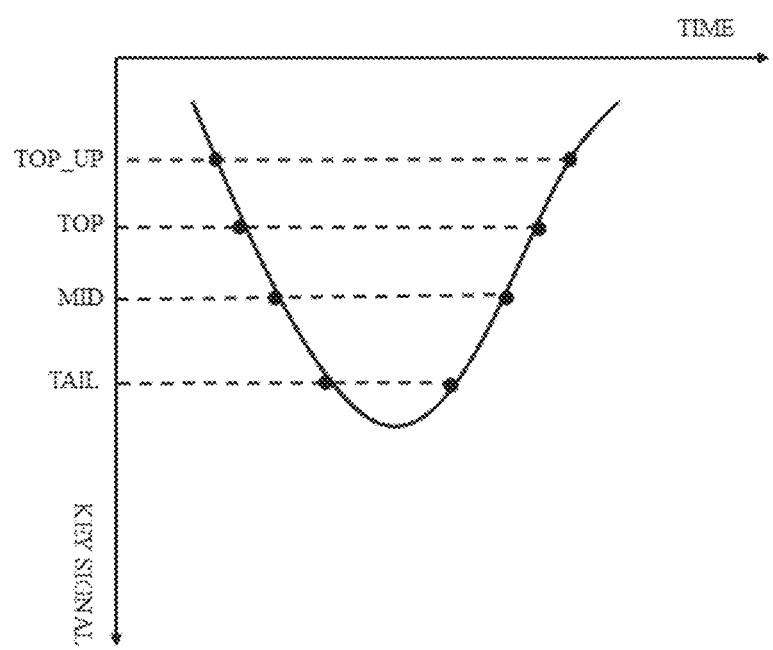
FIG. 11 illustrates another example of setting thresholds corresponding to a trajectory of a piano key according to the present disclosure.

FIG. 11 illustrates another example of a key signal corresponding to a trajectory of a piano key according to some embodiments of the present disclosure. In such example, the smart piano system may set four thresholds in the whole trajectory. As shown in FIG. 11, the four thresholds may be named TOP_UP, TOP, MID, TAIL. The four thresholds substantially divide the whole trajectory into five sections. These sections may or may not be evenly distributed along the axis corresponding to the key signal.

Figure 12:
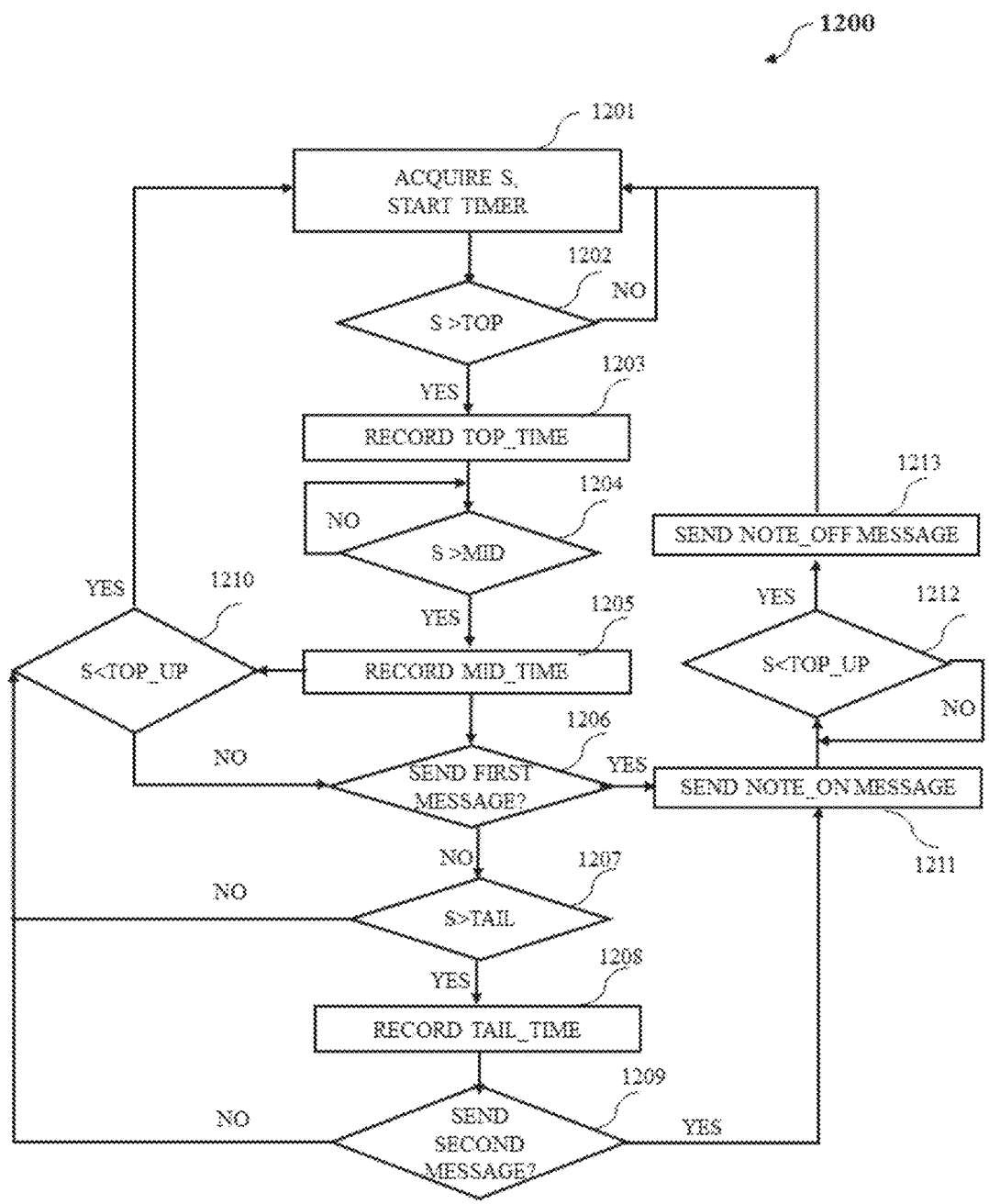
FIG. 12 is a flowchart illustrating another exemplary process for acquiring key signals according to some embodiments of the present disclosure.

FIG. 12 is a flowchart illustrating another exemplary process 1200 for acquiring a key signal of a piano key according to some embodiments of the present disclosure.

Process 1200 may start by acquiring a first value of the key signal of the key and starting a timer for time recording. The time to be recorded may include time of the key reaching positions represented by each threshold. The key signal S may be acquired by one or more sensors. And the key signal S may be also updated in one or more of the following steps.

In step 1202, process 1200 may determine if a first value of the key signal is greater than a first reference the value of the second threshold (e.g., "TOP" as described in connection with FIG. 11 above). If the value of the key signal S is greater than the value of TOP, the key has been depressed and has passed position represented by the first threshold TOP and process 1200 may then go to step 1203. If the value of the key signal S is not greater than (i.e., smaller than or equal to) the value of TOP, the key is currently located in a section between the position represented by the first threshold TOP and the "top" position. Process 1200 may then loop back to step 1201, and wait till the key reaches the position represented by the first threshold TOP.

In step 1203, time of the key moving from the "top" position and the position represented by the first threshold TOP ("TOP_TIME" as illustrated in FIG. 12) may be recorded. Then the key may keep moving towards the "end" position and process 1200 may then go to step 1204.

In step 1204, a second value of the key signal S may be obtained at a new position of the key. The smart piano system may determine if the second value of the key signal exceeds the value of the third threshold MID. If the second value of the key signal exceeds the third threshold MID (e.g., a "YES" in step 1204), the key has passed position represented by the third threshold MID, and process 1200 may then go to step 1205. If the second value of the key signal is not greater than (smaller than, or equal to) the value of the third threshold MID (e.g., a "YES" in step 1204), process 1200 may then loop back to step 1204 and wait till the key reaches the position represented by the third threshold MID.

In step 1205, time that the key reaches the position represented by the third threshold MID (i.e. MID_TIME) may be recorded. The key may keep moving (either be depressed towards the "end" position, or move back to the "top" position), and a third value of the key signal may be acquired. Then, the process may go to step 1206 and step 1210.

In step 1206, the smart piano system may determine if a first message regarding to the key signal may be provided. Merely by way of example, the first message may include MID_TIME, TOP_TIME, and three values of the key signal. In some embodiments, the determination in the step 1206 may be performed by checking if difference between the MID_TIME and TOP_TIME reaches a predefined value. The predefined value may be based on results of several tests performed on the piano 110 (as described in connection with FIG. 1 above). Merely by way of example, the tests may be performed by depressing each key one or more times, calculating depressing strength of each time of depressing, and recording time of the key reaching positions represented by each threshold. The depressing strength and the time may be used as reference to the predefined value. In step 1206, if the smart piano system determines to provide the first message ("YES" in step 1206), process 1200 may go to step 1211. If the first message may not be provided ("NO" in step 1206, process 1200 may go to step 1207. After step 1206, the key may keep moving and a fourth value of the key signal may be acquired.

In step 1207, the smart piano system may determine if the fourth value of the key signal exceeds the value of the fourth threshold TAIL. If the fourth value of the key signal exceeds the value of the fourth threshold TAIL, process 1200 may go to step 1208. If the fourth value of the key signal does not exceed (e.g., being smaller than or equal to) the value of the fourth threshold TAIL, process 1200 may go to step 1210.

In step 1208, the smart piano system may record time of the key reaches a position represented by the fourth threshold (TAIL_TIME as described in connection in FIG. 12). Then process 1200 may go to step 1209.

In step 1209, the smart piano system may determine if a second message regarding to the key signal may be provided. Merely by way of example, the second message may include the MID_TIME, TOP_TIME, TAIL_TIME, and four values of the key signal. In some embodiments, the determination in the step 1209 may be performed by checking if the difference between the TAIL_TIME and TOP_TIME reaches a predefined value. The predefined value may be based on results of several tests performed on the keys of the piano 110 (as described in connection with FIG. 1). Merely by way of example, the tests may be performed by depressing each key one or more times, calculating depressing strength of each time of depressing, and recording time of the key reaching positions represented by each threshold. The depressing strength and the time may be used as reference to the predefined value. If the smart piano system determines to provide the second message (a "YES" in step 1209), process 1200 may then go to step 1211. If the smart piano system determines to provide the second message (a "NO" in step 1209), process 1200 may then go to step 1210. After step 1209, the key may keep moving and a fifth value of the key signal may be acquired.

In step 1210, the smart piano system may determine if the third value (after step 1205), the third value (after step 1207) and/or the fifth value (after step 1209) of key signal S is smaller than the first threshold TOP_UP. If the value(s) of the key signal is smaller than the value of TOP_UP, the key may move back to the "top" position, and be located in a section between a position represented by the first threshold TOP_UP and the "top" position, and process 1200 may go back to step 1201. If the value(s) of the key signal is not smaller than the value of TOP_UP, the key may be located in a section between a position represented by the first threshold TOP_UP and the "top" position, and process 1200 may go back to step 1206.

In step 1211, the first and second messages may be converted to NOTE_ON message. The NOTE_ON message may include time for the smart piano system to start generate a musical note, sound frequency and/or loudness of the musical note, etc. After the step 1211, the key may keep moving and a sixth value of the key signal may be acquired. Then the process may go to step 1212.

In step 1212, the smart piano system may then determine if the sixth value of the key signal is smaller than the value of the first threshold TOP_UP. If the sixth value of the key signal is smaller than the value of TOP_UP, the key may move back to the "top" position, and be located in a section between a position represented by the first threshold TOP_UP and the "top" position. Then the smart piano system may provide NOTE_OFF message in step 1213. The NOTE_OFF message may include time for the smart piano system to end generating the musical note, instructions to record the sound frequency and loudness of the musical note, etc. If the sixth value of the key signal is not smaller than (greater than, or equal to) the value of TOP_UP, process 1200 may loop back to step 1202 and wait till the key passes the position represented by the first threshold TOP_UP.

It should be noted that the processes for signal acquisition provided above are provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Figure 13:
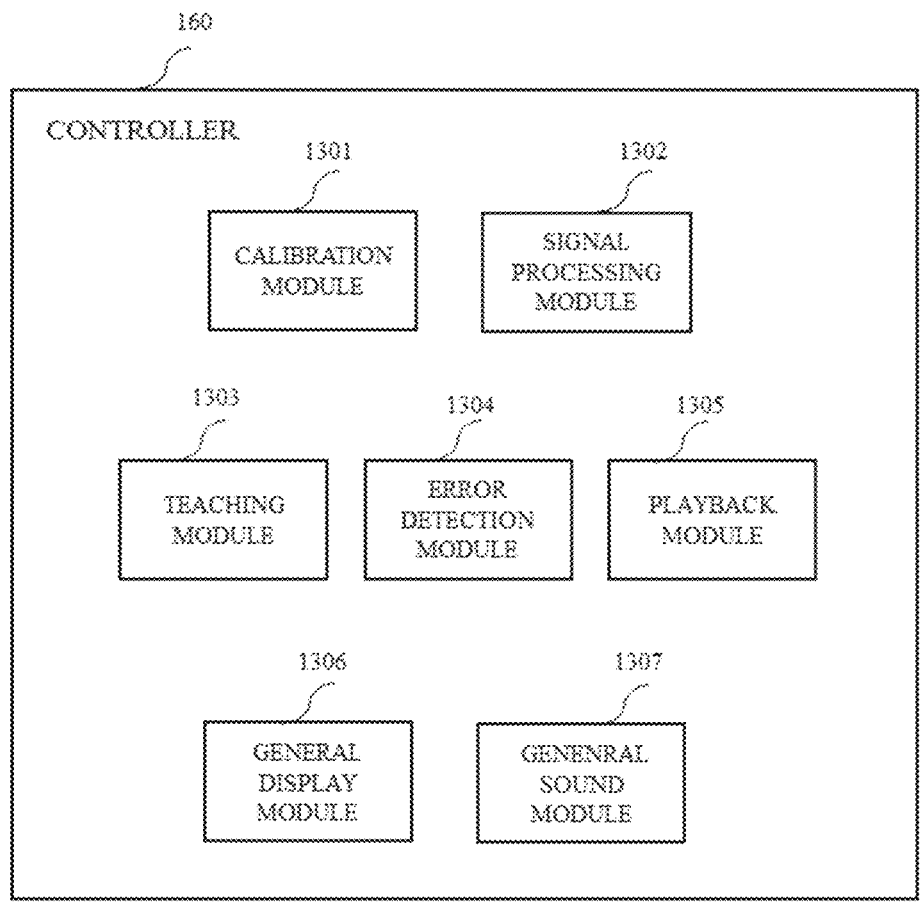
FIG. 13 is a block diagram illustrating a controller according to some embodiments of the present disclosure.

FIG. 13 is a block diagram illustrating a controller according to some embodiments of the present disclosure. As shown in FIG. 13, the controller 160 may include a calibration module 1301, a signal processing module 1302, a teaching module 1303, an error detection module 1304, a playback module 1305, a general display module 1306, a general sound module 1307, and/or any other component for performing various functions in accordance with the present disclosure.

More or less components may be included in the controller 160 without loss of generality. For example, two of the modules may be combined into a single module, or one of the modules may be divided into two or more modules. In one implementation, one or more of the modules may reside on different computing devices (e.g., desktops, laptops, mobile phones, tablet computers, wearable computing devices, etc.). In some embodiments, the controller of FIG. 13 may be and/or include the controller 160 as described above in connection with FIG. 1.

The calibration module 1301 may be configured to calibrate one or more sensors (e.g., sensors 301 of FIG. 3). For example, the sensors may be calibrated by performing one or more operations described in connection with FIG. 9 above.

The signal processing module 1302 may receive, process, store, transmit, and/or perform any other function on one or more key signals and/or pedal signals acquired by the signal acquisition engine 120. For example, the signal processing module 1302 can receive one or more key signals and/or pedal signals (e.g., one or more signals generated by the signal acquisition engine 120 of FIG. 1). The signal processing module 1302 can also process the key signals and/or pedals to obtain information about motion of one or more keys and/or pedals of a piano (e.g., by determining one or more positions of the keys and/or pedals, calculating velocities of the keys and/or pedals, and a strength of operating keys and/or pedals, etc.). The signal processing module can further generate one or more instructions indicating timing for musical note generation, transmit data (e.g., information about motion of one or more keys and pedals, timing information for musical notes generation, etc.) and can transmit the instructions to any other part of the smart piano system.

Figure 14:
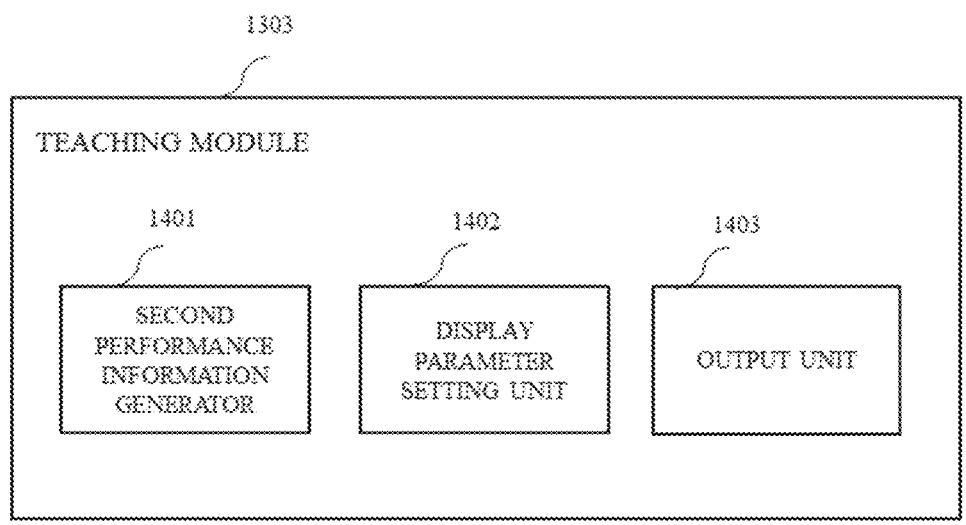
FIG. 14 illustrates an example of a teaching module according to some embodiments of the present disclosure.

The teaching module 1303 may be configured to implement a teaching mode. For example, the teaching module 1303 can receive information about a sample performance of a piece of music, generate performance information about the sample performance (e.g., also referred to herein as the "second performance information"), generate display instructions and/or display parameters for presenting the second performance information, and/or perform any other function to implement the teaching mode. In some embodiments, the second performance information may include one or more operation sequences of keys and/or pedals during the sample performance, timing information of the keys and/or pedals, musical notes produced during the sample performance, and/or any other information about the sample performance. In some embodiments, the teaching module 1303 may be and/or include one or more teaching modules as illustrated in FIG. 14.

Figure 16:
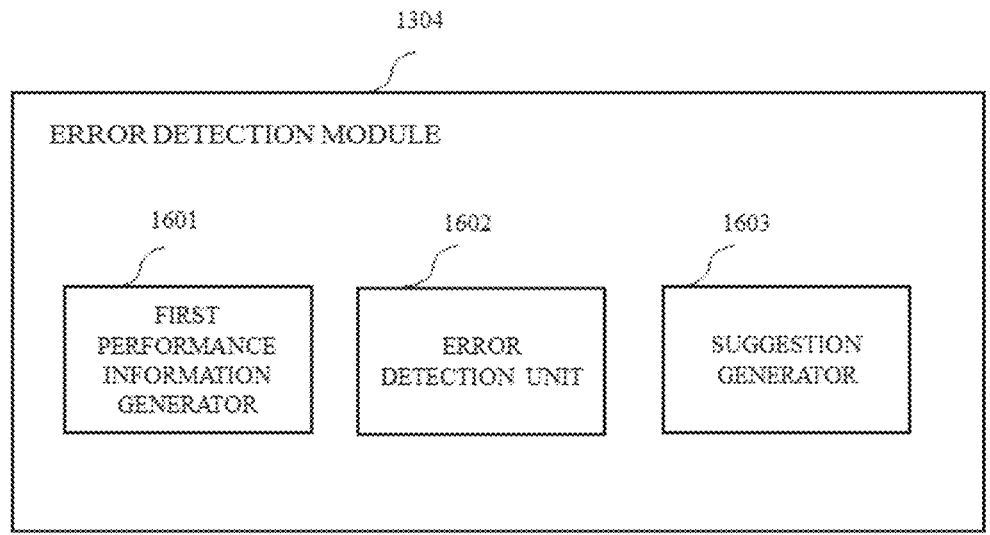
FIG. 16 illustrates an example of an error detection module according to some embodiments of the present disclosure.

The error detection module 1304 may be configured to implement an error detection mode. For example, the error detection module 1304 may detect errors in the first and/or second performance information. The errors in the first and/second performance information may include wrong timing of operating one or more keys and/or pedals, wrong operation sequences of one or more keys and/or pedals, inappropriate strength of operating one or more keys and/or pedals, etc. The error detection module 1304 may also be capable of providing suggestions for the player. The suggestions may be based on the errors in the first and/or second performance information. For example, the suggestions may include learning a sample performance from another expert, paying more efforts on playing certain musical notes, etc. In some embodiments, the error detection module 1304 may include one or more error detection modules as illustrated in FIG. 16.

The playback module 1305 may be configured to implement a playback mode. For example, the playback module 1305 can generate one or more instructions for reproducing the first performance information generated previously. For example, the playback module 1305 may reproduce the first performance information by displaying images about musical notes and operation sequences of keys or pedals, generate electric sounds and/or acoustic sounds based on the musical notes.

The general display module 1306 and the general sound module 1307 may be configured to provide instructions for the display engine 170 and the sound engine 150, respectively. For example, the general display module 1306 may provide one more instructions indicating content for displaying (e.g., timing information of operating keys and pedals, musical notes, symbols for indicating operation sequences of keys and pedals, etc.), display parameters (e.g., displaying speed, brightness and/or contrast ratio of one or more screens, etc.), and/or any other information for displaying. For example, the general sound module 1307 may provide one or more instructions indicating content for sound generation (e.g., one or more musical notes emphasized by sounds with specific frequencies or volumes, etc.), parameters of the sound generation (e.g., start and/or end time of the sound generation, volumes and/or frequencies of the sounds, etc.).

It should be noted that the controller provided above is provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Turning to FIG. 14, an example of a teaching module in accordance with some embodiments of the present disclosure is shown. As illustrated, the teaching module 1303 may include a second performance information generator 1401, a display parameter setting unit 1402, an output unit 1403, and/or any other component for performing a teaching mode in accordance with some embodiments of the present disclosure. In some embodiments, each component of the teaching module 1303 can perform one or more operations described in connection with FIG. 15 below.

The second performance information generator 1401 can generate second performance information and/or any other information about piano performances. In some embodiments, the second performance information can include any suitable information about a performance of a piece of music, such as operation sequences of one or more keys and/or pedals, timing information of the keys and/or pedals, and musical notes in the piece of music. In some embodiments, the performance may be a sample performance of the piece of music that is performed by a piano teach, a pianist, and/or any other player.

The second performance information may be generated based on any suitable data. For example, the second performance information may be generated based on musical data about the piece of music, such as a video, an audio file, a picture, etc. In some embodiments, the second performance information may be generated based on a video recording a performance of a player. The second performance information generator 1401 may generate information about operation sequences of keys and/or pedals by analyzing body motions (e.g., motion of fingers, motion of feet, etc.) of the player. In some embodiments, the second performance information generator 1401 may record the musical notes played in the audio file. The operation sequences of keys and/or pedals, timing and strength of operating keys and/or pedals may also be determined based on the musical notes, volumes of musical notes played at different times (e.g., different volumes may correspond to different strengths applied to a key and/or pedal), frequencies of sounds (e.g., sounds with high frequencies may be played by black keys instead of white keys). In some embodiments, the second performance information generator 1401 may also generate the second performance information from one or more pictures. Merely by way of example, the one or more pictures may include symbols or patterns indicating the operation sequences of keys and/or pedals. The symbols or patterns in the picture(s) may be converted into a machine-encoded text by optical character recognition (OCR) devices, CCD flatbed scanner, text-to-speech synthesizer, and any other device capable of implementing conversion of the picture(s).

The display parameter setting unit 1402 can generate one or more instructions, parameters, and/or any other data that can be used to present the second performance information on a display device (e.g., a display device included in and/or communicatively coupled to the display engine 170). For example, display parameter setting unit 1402 can generate data that can be used to render one or more user interfaces for presenting the second performance information (e.g., one or more user interfaces of FIGS. 21A-21G). As another example, the display parameter setting unit 1402 can generate one or more parameters for presenting the second performance information (also referred to herein as the "display parameters"). In a more particular example, the display parameters can include one or more timestamps related to a playback of the second performance information (e.g., a start time, an end time, and/or any other timestamp related to the playback of the content). In another more particular example, the display parameters can include one or more encoding parameters, decoding parameters, and/or any other parameter that can be used to decode, process, display, and/or perform other function on content related to the second performance information. The content related to the second performance may include one or more images, video content, audio content, graphics, text, and/or any other content.

The output unit 1403 can provide the display data (e.g., instructions, display parameters, etc.), the musical data, the second preformation information, and/or any other data to one or more other devices for processing, storing, presentation, etc.

Figure 15:
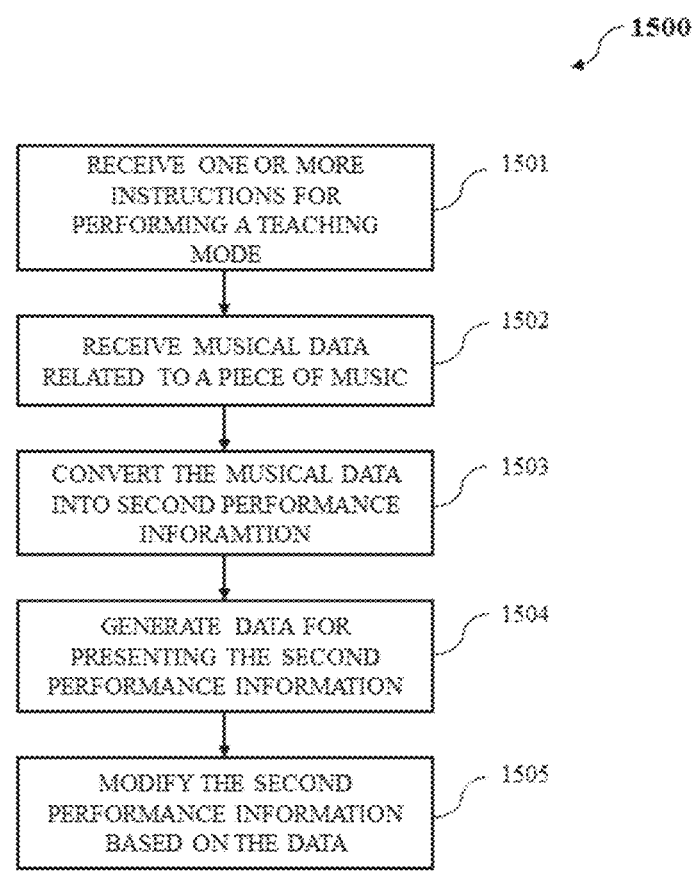
FIG. 15 is a flowchart illustrating an example of a process for performing an teaching mode according to some embodiments of the present disclosure.

FIG. 15 is a flowchart illustrating an example 1500 of a process for performing a teaching mode in accordance with some embodiments of the present disclosure. Process 1500 may be performed by processing logic that comprises hardware (e.g., circuitry, dedicated logic, programmable logic, microcode, etc.), software (e.g., instructions run on a processing device to perform hardware simulation), or a combination thereof. In some implementations, process 1500 may be performed by a processing device 105 as described above in connection with FIG. 1.

As illustrated, process 1500 may begin by acquiring one or more instructions for performing the teaching mode in step 1501. The instructions may be and/or include one or more user inputs, instructions generated by the controller 160, etc. The instructions may include one or more instructions indicating a user request to initiate the teaching mode, one or more settings for performing the teaching mode (e.g., setting a start time, an end time, and/or any other timing information for the teaching mode, selecting content provided by the teaching mode, etc.), and/or any other information about the teaching mode. The instructions may also include one or more instructions for storing data existed in the teaching mode (e.g., the user request, setting(s), contents provided by the teaching mode, etc.), transmitting the data to any other part of the smart piano system.

In step 1502, process 1500 may receive musical data. The musical data may be received from the external input engine 140, the storage device 130, a cloud-based storage device, a server, and/or any other device that is capable of providing musical data. The musical data can include any information about a piece of music, such as a video, an audio file, a picture, etc. In some embodiments, the piece of music may be identified by a user (e.g., a player of the piano). For example, the smart piano system can prompt the user to select a piece of music from a list of pieces of music and/or to provide information about the piece of music (e.g., by providing one or more user interfaces). As another example, the player may identify the piece of music and/or the musical data by initiate a download of the musical data and/or extraction of the musical data from a device that stores the musical data. In some embodiments, the piece of music can be identified based on audio content related to a performance of the piece of music (e.g., using suitable audio matching, fingering, and processing techniques).

In step 1503, the musical data may be converted into second performance information. The conversion may be achieved by the second performance information generator 1401 using methods described in connection with FIG. 14 above.

In step 1504, process 1500 may generate data for presenting the second performance. The data can include one or more instructions, settings, parameters, and/or any other information that can be used to present the second performance information. In some embodiments, the data can include one or more display parameters, instructions, etc. generated by the display parameter setting unit 1402.

In step 1505, the second performance information may be modified based on the displaying parameters, settings, instructions and any other information for performing the teaching mode. In some embodiments, content of the second performance information may be changed according to the settings. For example, if the settings include a user request to omit presentation of one or more musical notes on a display device, the musical notes in the second performance information may be deleted. The modified second performance information may be displayed via the display engine 170.

FIG. 16 illustrates an example of an error detection module according to some embodiments of the present disclosure. As illustrated, the error detection module 1304 may include a first performance information generator 1601, an error detection unit 1602, a suggestion generator 1603, and/or any other component for performing an error detection mode in accordance with some embodiments of the present disclosure. In some embodiments, each components of the error detection module 1304 can perform one or more operations described in connections with FIG. 17 below.

The first performance information generator 1601 may generate first performance information and/or any other information about piano performances. In some embodiments, the first performance information may include any suitable information about a first performance of a piece of a music by a player (e.g., a user of the smart piano system). For example, the first performance information can include information about operation sequences of one or more keys and/or pedals, timing information of the keys and/or pedals, musical notes generated by the first performance, chords played by the player, and/or any other information about the first performance. The first performance information may be generated based on one or more key signals and/or pedal signals. For example, the first performance information generator 1601 may record operation sequences of one or more keys and/or pedals, calculate strength and velocity of operating keys and/or pedals, and reproduce musical notes by extracting corresponding information in the key signals and pedal signals.

The error detection unit 1602 may detect errors in the performance based on the first performance information. The errors may include one or more errors in timing of operating one or more keys and/or pedals during the first performance, errors in operation sequences of one or more keys and/or pedals, inappropriate strengths applied to one or more keys and/or pedals, erroneous chords played during the performance, and/or any other information that may be regarded as being an error. The errors may be detected based on reference performance information representative of a sample performance of the piece of music. The first performance information and the reference performance information may correspond to performances of the same music (e.g., a piano piece). In some embodiments, the errors may be detected by comparing one or more portions of the first performance information with corresponding portions of the reference performance information. For example, the first performance information and the reference performance information may be compared to detect discrepancies in operation sequences of keys and/or pedals, strengths applied to keys and/or pedals, velocities of keys and/or pedals, start times and/or end times of operating keys and/or pedals, musical notes produced by the two performances, etc. In some embodiments, the reference performance information may be the second performance information generated by the second performance information generator 1401.

The suggestion generator 1603 may generate suggestions for a player. Exemplary suggestions may include learning sample performances from experts, paying more efforts on playing certain musical notes, etc. In some embodiments, the suggestions may be from a cloud-based storage device, a server, and/or any other device capable of providing the suggestions. For example, the suggestions may be stored in a cloud-based storage device indexed by any possible error. Each error may be directed to one or more suggestions. In some embodiments, the suggestions may be from one or more real-time expert databases. Each real-time expert database may be connected to one or more experts which may provide suggestions after receiving one or more errors. The smart piano system may provide the errors to one or more real-time expert databases and extract suggestions from the real-time expert databases. In some embodiments, the suggestions may be generated based on history of errors recorded by the smart piano system. For example, if number of one or more certain errors exceeds a threshold value, the smart piano system may provide suggestions to prompt the player's notice on the error(s).

Figure 17:
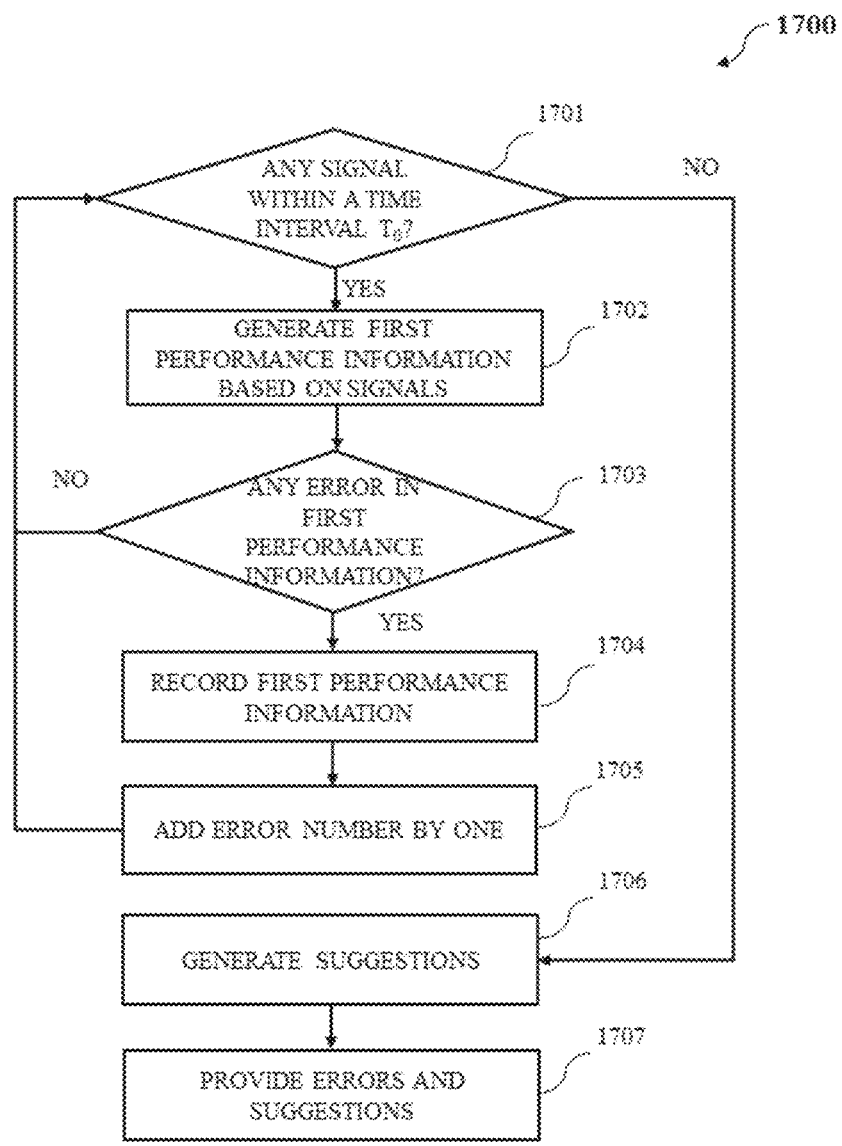
FIG. 17 is a flowchart illustrating an example of a process for performing an error detection mode according to some embodiments of the present disclosure.

FIG. 17 is a flowchart illustrating an example 1700 of a process for performing an error detection mode in accordance with some embodiments of the present disclosure.

As shown in FIG. 17, process 1700 may begin by determining if any key signal or pedal signal has been acquired within a time interval $T_0$ in step 1701. The time interval $T_0$ may be set empirically. In some embodiments, the time interval $T_0$ may be based empirically on time interval of a player depressing two successive keys. The time interval $T_0$ may be a few seconds, or a few minutes, or any other suitable value.

If one or more of the key signals and/or pedal signals may be provided by the signal acquisition engine 120 of FIGS. 1 and 3, process 1700 may then go to step 1702. If no key signal or pedal signal may be provided by the signal acquisition engine 120, process 1700 may determine that a performance has been completed and may go to step 1706.

In step 1702, the first performance information may be generated based on one or more of the key signals and/or pedal signals. For example, the error detection module 1304 may record operation sequences of one or more keys and/or pedals, calculate strength and velocity of operating keys and/or pedals, and reproduce musical notes by extracting corresponding information in the key signals and pedal signals.

In step 1703, the first performance information may be processed and/or analyzed to detect one or more errors in the first performance information may be detected. In some embodiments, the error detection may be performed by comparing the first performance information with the reference performance information representative of a sample performance. The errors may be detected by the error detection unit 1602 (as described in connection with FIG. 16). Details may be omitted for simplicity. If any error is found in the first performance information, process 1700 may then go to step 1704. If no error is found in the first performance information, process 1700 may then loop back to step 1701 and begin a new round of error detection.

In step 1704, the first performance information, the errors of the first performance information, the time of the performance, and any other information existed in process 1700 may be recorded.

In step 1705, error number of wrong first performance information accordingly may be incremented by a step.

Process 1700 may then loop back to the step 1701 and may determine whether any signal acquired after a time interval $T_0$. If no signal being acquired after the time interval, which may indicate the performance is completed, process 1700 may go to step 1706. In step 1706, one or more suggestions may be provided to the player. In some embodiments, process 1700 may compare the detected errors in the newly recorded first performance information with historical data about errors detected in the player's previous performances. The error detection module 1304 may also compare the detected errors with errors from a database. In some embodiments, the database may be internet based. Merely by way of example, the smart piano system may access the database via the external input engine 140 and run certain applications to evaluate the errors in the newly recorded first performance information.

In step 1707, the errors in the first performance information and suggestions may be provided to the player. Merely by way of example, the errors in the first performance information and suggestions may be displayed in the display engine 170.

Figure 18:
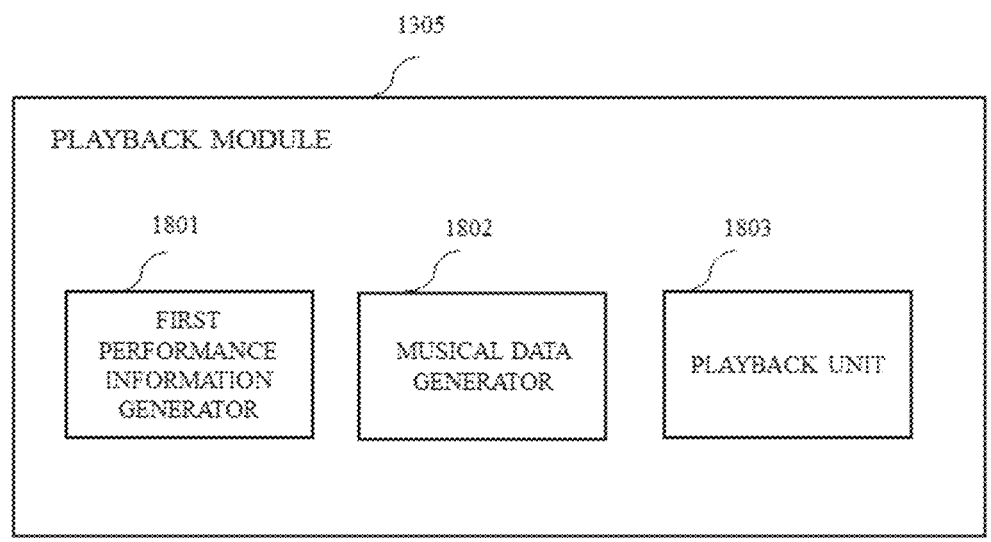
FIG. 18 is a block diagram illustrating an example of a playback module according to some embodiments of the present disclosure.

FIG. 18 is a block diagram illustrating an example of a playback module 1305 according to some embodiments of the present disclosure. As shown, the playback module 1305 may include a first performance information generator 1801, a musical data generator 1802, a second performance information generator 1803, and/or any other component for performing a playback mode in accordance with some embodiments of the present disclosure. In some embodiments, each component of the playback module 1305 can perform one or more operations described in connection with FIG. 19 below.

The first performance information generator 1801 may generate the first performance information about performances of a player. The first performance information may include any information that can be generated by the first performance information generator 1601 of FIG. 16. In some embodiments, the first performance generator 1801 of FIG. 18 can be and/or include the first performance information generator 1601 of FIG. 16.

The musical data generator 1802 may convert the first performance information into musical data. The musical data may be in any suitable form, such as a video, an audio file, a picture, etc. The musical data may be stored in the storage device 130, a database, a personal computer, and/or any suitable storage device.

The playback unit 1803 may convert the musical data into the second performance information. In some embodiments, the playback unit 1803 may extract operation sequences of one or more keys and/or pedals, timing information (e.g., start and/or end time of musical note generation) of musical notes, and any other information in order to convert the musical data into the second performance information. The playback unit 1803 may also provide the second performance information to the player. In some embodiments, the playback unit 1803 may transmit the second performance information and/or the musical data to the display engine 170 and/or the sound engine 150. The display engine 170 may present the second performance information in form of videos, images, etc. The sound engine 150 may present the second performance in form of acoustic and/or electric sounds.

Figure 19:
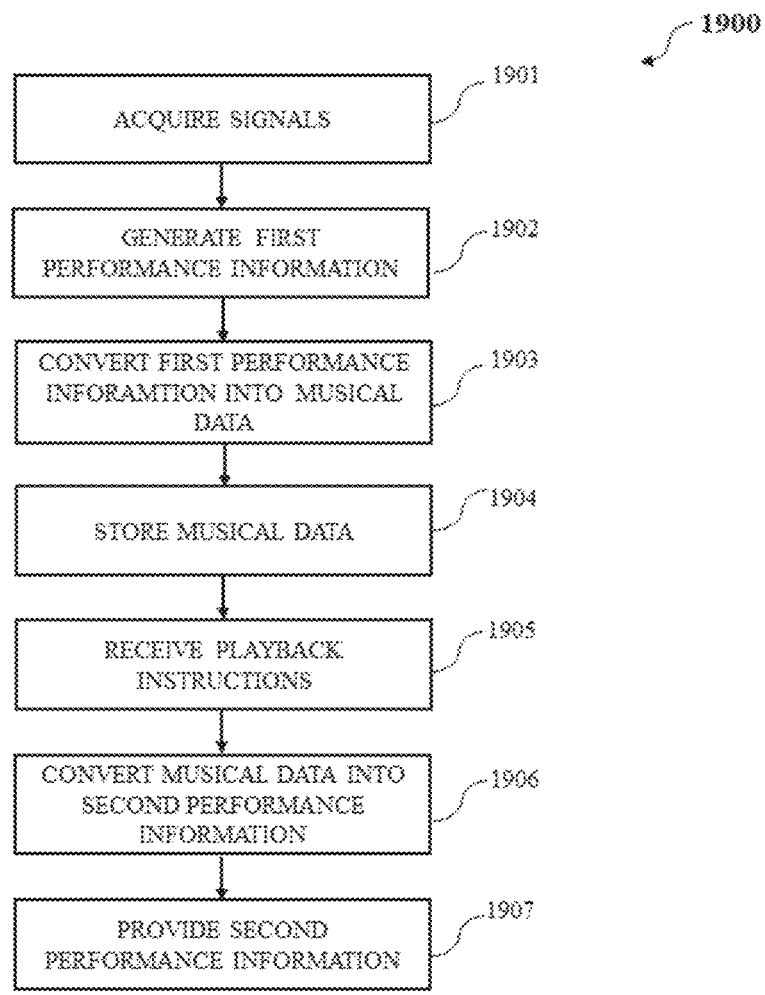
FIG. 19 is a flowchart illustrating an example of a process for performing a playback mode according to some embodiments of the present disclosure.

FIG. 19 is a flowchart illustrating an example 1900 of a process for performing a playback mode in accordance with some embodiments of the present disclosure. Process 1900 may be performed by processing logic that comprises hardware (e.g., circuitry, dedicated logic, programmable logic, microcode, etc.), software (e.g., instructions run on a processing device to perform hardware simulation), or a combination thereof. In some implementations, process 1900 may be performed by a processing device 105 as described above in connection with FIG. 1.

As illustrated, process 1900 may begin by acquiring one or more key signals and/or pedal signals in step 1901.

In step 1902, the first performance information may be generated. In some embodiments, the first information may be generated according to one or more key signals and/or pedal signals. The first performance information may be generated by the first performance information generator 1801 using the methods described in connection with FIG. 18 above.

In step 1903, the first performance information may be converted into musical data in step 1903. The musical data may be converted by the musical data generator 1802 as described in connection with FIG. 18 above.

In step 1904, the musical data may be stored. The musical data may be in any suitable form, such as a video, an audio file, a picture, etc. The musical data may be stored in the storage device 130, a database, a personal computer, and/or any suitable storage device.

In step 1905, the playback module 1305 may receive playback instructions. The playback instructions may be and/or include one or more user (e.g., a player) inputs, instructions generated by the controller 160, etc. The instructions may include one or more instructions indicating a user request to initiate the playback mode, one or more settings for performing the playback mode (e.g., setting end time for the playback mode, selecting contents provided by the playback mode, etc.), and/or any other information about the playback mode. The instructions may also include one or more instructions for storing data existed in the playback mode (e.g., the user request, setting(s), contents provided by the teaching mode, etc.), transmitting the data to any other part of the smart piano system. For example, a player may decide to playback a piece of music he just played. In some embodiments, the smart piano system may automatically require the piece of music a player just played to be played back.

In step 1906, the musical data may be converted into a second performance information according to the playback instructions. The musical data may be converted by the second performance information generator 1803 using the methods described in connection with FIG. 18 above.

In step 1907, the second performance information may be provided for the player. Merely by way of example, the second performance information may be presented in the display engine 170 and the sound engine 150. The display engine 170 may present the second performance information in form of videos, images, etc. The sound engine 150 may present the second performance in form of acoustic and/or electric sounds.

It should be noted that the components of the controller provided above are provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Figure 20:
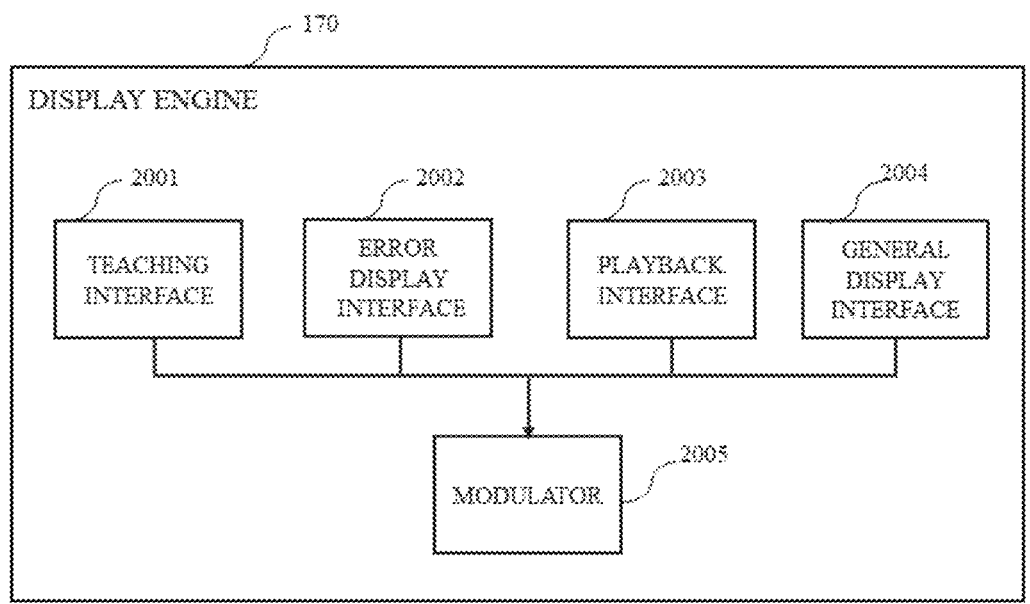
FIG. 20 is a block diagram illustrating an example of a display engine according to some embodiments of the present disclosure.

FIG. 20 is a block diagram illustrating an example of a display engine according to some embodiments of the present disclosure. As shown in FIG. 20, the display engine 170 may include a teaching interface 2001, an error display interface 2002, a playback interface 2003, a general display interface 2004, a modulator 2005, and/or any other component for performing various functions in accordance with the present disclosure.

More or less components may be included in the display engine 170 without loss of generality. For example, two of the interfaces may be combined into a single interface, or one of the interfaces or the modulator may be divided into two or more interfaces and/or modules. In one implementation, one or more of the modules may reside on different computing devices (e.g., desktops, laptops, mobile phones, tablet computers, wearable computing devices, etc.). In some embodiments, the display engine of FIG. 20 may be and/or include the display engine 170 as described above in connection with FIG. 1.

The teaching interface 2001 may communicate with the teaching module 1303 and any other component of the smart piano system. In some embodiments, the teaching interface 2001 may receive, process and store data (e.g., the displaying parameters, the teaching instructions, the musical data, the second performance information, etc.) about the teaching mode (as described in FIGS. 14 and 15). In some embodiments, the teaching interface 2001 may transmit the data about the teaching mode to the modulator 2005. The teaching interface 2001 may direct the modulator 2005 to present the data about the teaching mode. For example, the modulator 2005 may display musical notes, virtual keys, indicators for one or more keys and/or pedals, teaching videos and any other content in one or more display devices.

The error display interface 2002 may communicate with the error detection module 1304 and any other component of the smart piano system. In some embodiments, the error display interface 2002 may receive, process, and store data about the error detection mode (e.g., the key signals, the pedal signals, the first performance information, the errors in the first performance information, the suggestions, etc.). In some embodiments, the error display interface 2002 may transmit the data about the error detection mode to the modulator 2005. The error display interface 2002 may direct the modulator 2005 to present the data about the error detection mode. For example, the modulator 2005 may display musical notes, virtual keys, indicators for one or more keys and/or pedals, videos, errors in the first performance information and/or any other content in one or more display devices.

The playback interface 2003 may communicate with the playback module 1305 and/or any other component of the smart piano system. In some embodiments, the playback interface 2003 may receive, process and store data (e.g., the key signals, the pedal signals, the first performance information, the musical data, the playback instructions, the second performance information, etc.) about the playback mode (as described in connection with FIGS. 18 and 19). In some embodiments, the playback interface 2003 may transmit the data about the playback mode to the modulator 2005. The playback interface 2003 may direct the modulator 2005 to present the data about the playback mode. For example, the modulator 2005 may display musical notes, virtual keys, indicators for one or more keys and/or pedals, videos and any other content in one or more display devices.

The general display interface 2004 may be communicate the general display module 1304 and any other component of the smart piano system. In some embodiments, the general display interface 2004 may receive, process and store data (e.g., the key signals, the pedal signals, the first performance information, the musical data, the displaying parameters, the second performance information, etc.) as described in connection with FIG. 13. In some embodiments, the general display interface 2004 may transmit the data to the modulator 2005. The general display interface 2004 may direct the modulator 2005 to present the data. For example, the modulator 2005 may display musical notes, virtual keys, indicators for one or more keys and/or pedals, videos and any other content in one or more display devices.

The modulator 2005 may be configured to receive, process, present data from any other part of the display engine 170. In some embodiments, the modulator 2005 may include one or more screens to present the data. The one or more screens may present the data in any suitable form, such as videos, pictures, etc. Merely by way of example, the one or more screens may display videos regarding to fingering sequences of keys in a piece of music, pictures regarding to musical manuscripts, etc. In some embodiments, the modulator 2005 may communicate with one or more electronic devices, such as a portable DVD player, a portable gaming device, a cellular telephone, a personal digital assistant (PDA), a musical video player (e.g., a MP4 player), or any other suitable fixed or portable device. For example, the modulator 2005 may connect to one or gaming devices and present the player a game regarding to a piece of music.

It should be noted that the components of the display engine provided above are provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure. For example, the components of the display engine may not operate independently. In some embodiments, the error display interface 2002 may work together with the playback interface 2003. In a more particular embodiment, the smart piano system may acquire one or more user (e.g., a player) requests, which may direct the smart piano system to playback a piece of music the player previously played and display errors in the piece of music simultaneously.

Figure 21A:
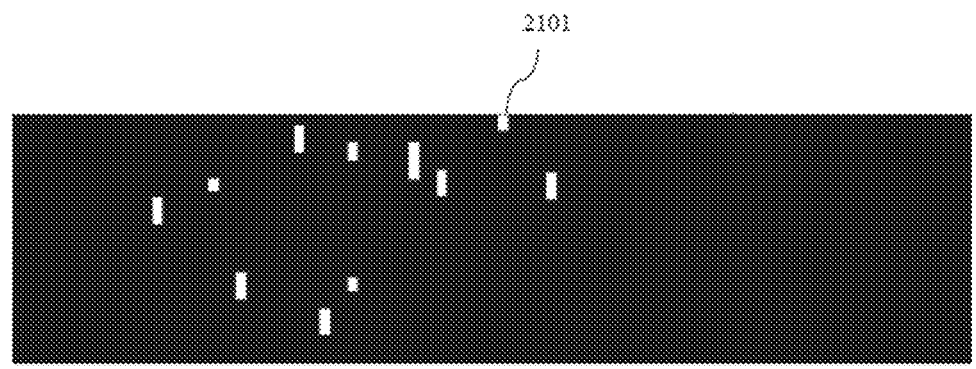
FIGS. 21A though 21G illustrate examples of user interfaces for presenting performance information and/or musical data according to some embodiments of the present disclosure.

FIGS. 21A though 21G illustrate examples of user interfaces for presenting performance information and/or musical data according to some embodiments of the present disclosure.

Figure 21B:
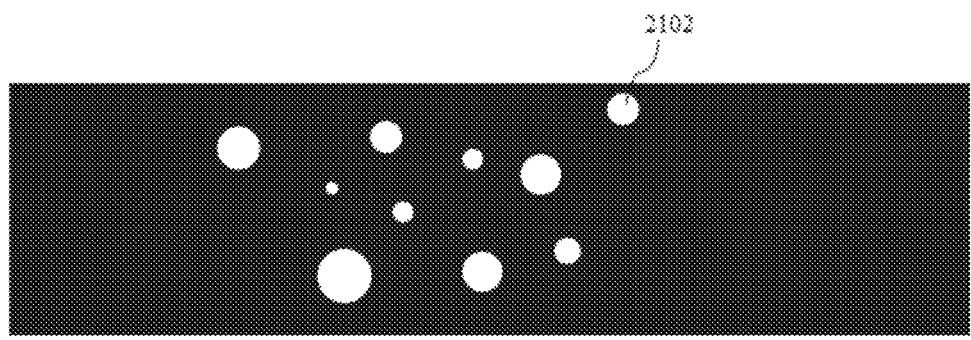
FIG. 21H illustrates examples of function-selection pedals according to some embodiments of the present disclosure.

As shown in FIGS. 21A and 21B, one or more key indicators (e.g., rectangle-like key indicator 2101 and bubble-like key indicators 2102) and/or virtual keys (e.g., virtual keys 2103) may be displayed in the user interface. The one or more key indicators and/or virtual keys may be in any suitable form. Merely by way of example, shape of the key indicators and the virtual keys may substantially be bubble, rectangle, triangle, polygon, or any combination thereof. The one or more key indicators and/or virtual keys may correspond to one or more real keys in a keyboard of the piano 110 (as described in connection with FIG. 1). The key indicators may be changed according to depressing strength and depressing time of the corresponding keys. In some embodiments, the depressing strength of keys may be utilized to define length (e.g., height of the rectangle-like key indicator 2101) or diameter (e.g., diameter of the bubble-like key indicator 2102) of the corresponding key indicators. Merely by way of example, the height of the rectangle-like key indicators 2101 or the diameter of the bubble-like key indicators 2102 may be gradually reduced after the corresponding keys are depressed. The key indicators 2101 and 2102 may also move from top of the display area to bottom in a velocity proportional to the depressing time of the corresponding keys.

Figure 21C:
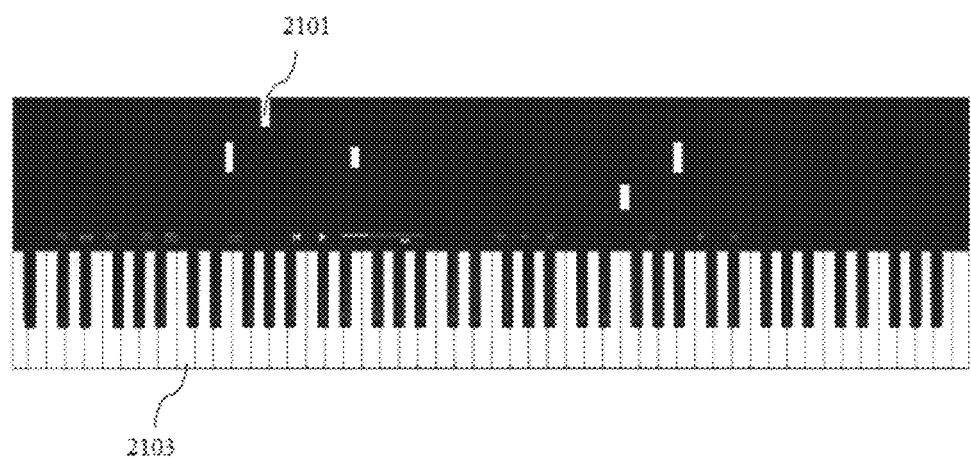

FIG. 21C shows another exemplary user interface on which the key indicator (e.g., the rectangle-like key indicator 2101) may be also displayed together with one or more virtual keys 2103. Each virtual key may correspond to a real white or black key in the keyboard. In some embodiments, size of each virtual key 2103 may substantially be equal to the real white or black key. The key indicators may work together with the virtual keys 2103 to indicate depressing sequences, the depressing strength and depressing time of the real keys.

Figure 21D:
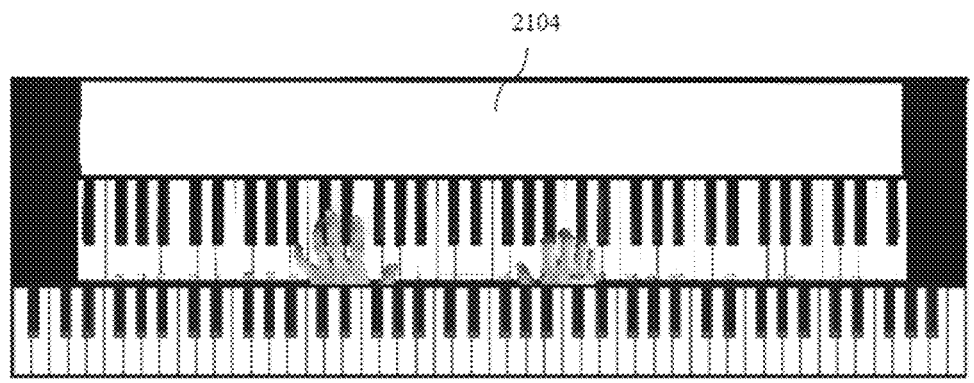
Figure 21E:
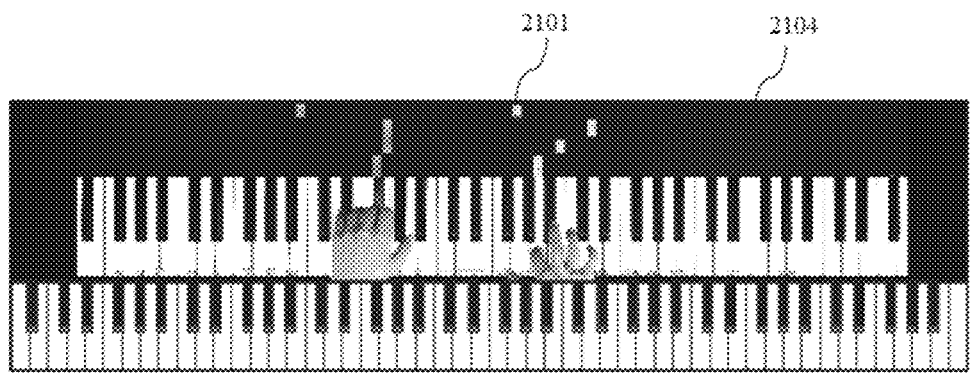
Figure 21F:
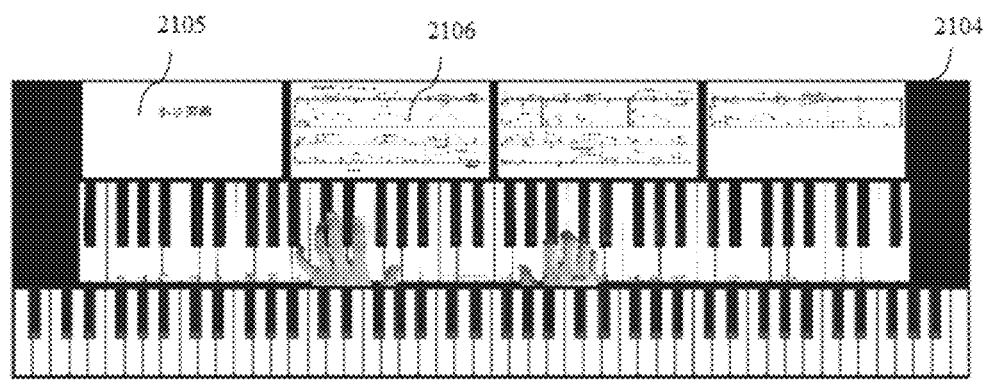

FIGS. 21D through 21F illustrate some other exemplary user interfaces in accordance to some embodiments of the present disclosure. As illustrated, the user interfaces may include a video play area 2104, a musical annotation display area 2105, a musical manuscript displaying area 2106, and any other display area to display any suitable content. In some embodiments, the video play area 2104 may display one or more videos about a piece of music. For example, a teaching video may provide a sample performance from an expert by displaying the rectangle-like key indicator 2101 and fingering sequences of the keys. In some embodiments, the musical annotation display area 2105 may provide musical annotations, such as annotations about one or more musical notes, annotations about background of a piece of music (e.g., the person who composed the piece of music, stories about the piece of music, etc.), suggestions for the player, and any other suitable musical annotation. In some embodiments, the musical manuscript displaying area 2106 may provide one or more musical manuscripts. The one or more musical manuscripts may be used to identify a preceding musical note and a subsequent musical note.

Figure 21G:
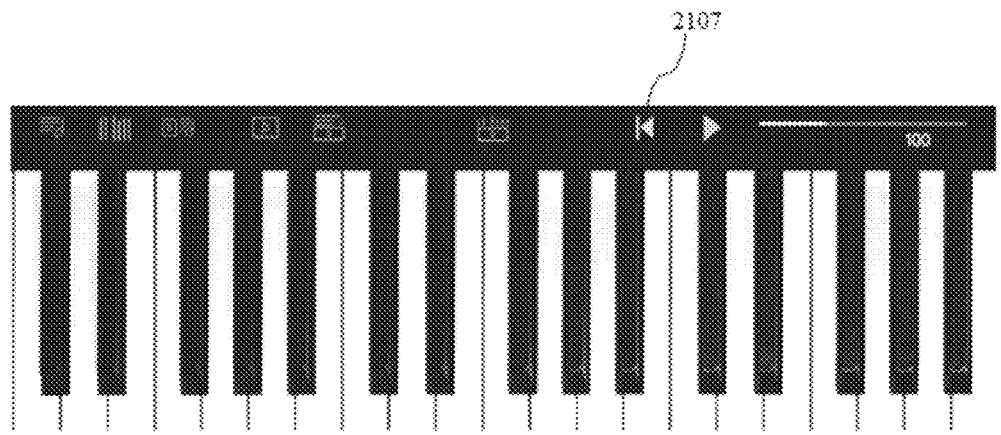

FIG. 21G illustrates another exemplary user interface according to some embodiments of the present disclosure. The user interface illustrated in FIG. 21G may provide one or more virtual keys and function icons 2107. In some embodiments, each function icon may be coupled to one or more virtual keys. The functions represented by the function icons may be triggered by a player depressing an individual real key or a combination of several keys in the keyboard of the piano 110 (as described in connection to FIG. 1). One or more virtual keys may indicate sequences of depressing one or more keys. For example, depressing one or more real keys in the keyboard may be used to trigger a function control interface (not shown in FIG. 21G). The function control interface may not be triggered when a piece of music is played. The function control interface may include several function icons 2107. The functions may be triggered by depressing the real keys or the combination of real keys in the keyboard.

In some embodiments, one or more functions of the smart piano system may be performed responsive to a user's operation of one or more control devices, such as one or more additional pedals installed on a piano (e.g., function-selection pedals as described below), one or more MIDI keyboards, etc. Each of the control devices may be integrated with the smart piano system and/or implemented as a stand-alone device. One or more of the control devices may be operated by a user's hands, feet, etc. One or more functions of the smart piano system may be performed responsive to any user input received via the control device(s), such as gestures, eye movement, etc. For example, a first performance information related to a piece of music may be generated when a user fingers on a MIDI keyboard.

Figure 21H:
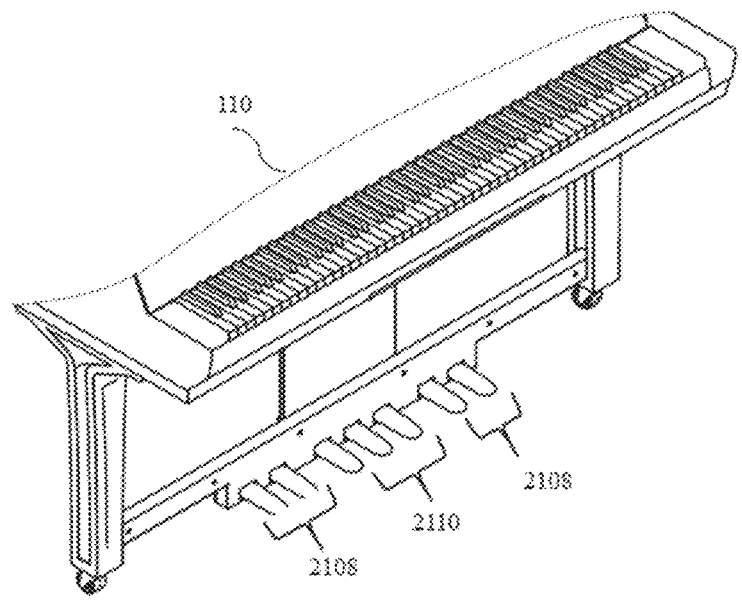

As another example, as shown in FIG. 21H, a piano 110 may include one or more pedals, such as one or more function-selection pedals 2108 and piano pedals 2110. Each of the pedals can be operated by a user's foot and/or feet. Each of piano pedals 2110 may be or include a foot-operated lever that can modify the piano's sound. For example, the piano pedals 2110 may include a soft pedal (e.g., a una corda pedal) that may be operated to cause the piano to produce a softer and more ethereal tone. As another example, the piano pedals 2110 may include a sostenuto pedal that may be operated to sustain selected notes. As still another example, the piano pedals 2110 may include a sustaining pedal (e.g., a damper pedal) that may be operated to make notes played continue to sound until the pedal is released.

Each of function-selection pedals 2108 may be and/or include a foot-operated input device that can receive user input entered by a user's foot and/or feet. In some embodiments, one or more of the function-selection pedals 2108 are not used to play a piece of music. Motions of one or more function-selection pedals 2108 and/or one or more music-playing pedals may be detected by one or more pedal sensors (as described in connection with FIG. 3-4). The one or more pedal sensors may be and/or include an opto-electric sensor, a magneto-electric sensor, an angle sensor, a piezo-electric sensor, a Hall sensor, a grating sensor, a potentiometer, an encoder, a TACT switch, or a limit switch. Information about the motions of the pedals (as described in connection with FIG. 2-4) may be transmitted to the controller 160, the storage device 130, and/or any other component of the smart piano system. The information about motions of the pedals may be transmitted via long-distance communication (e.g., optical fiber, WLAN, radio wave, etc.) and/or short-distance communication (e.g., Bluetooth, ZigBee, Wi-Fi, etc.).

When a user operates one or more function-selection pedals 2108, the smart piano system may perform one or more functions based on the operation of the pedal(s), such as turning pages of a music sheet, presenting content on a display (e.g., moving a cursor presented by the display engine), adjusting one or more parameters (e.g., volume, display speed, beat of a piece of music, etc.) for presentation of content related to the first performance information and/or the second performance information, implementing one or more modes and/or functions (e.g., sound compensation)

defined by the smart piano system, a function defined by a user, and/or any other function of the smart piano system. In some embodiments, operation of one or more particular function-selection pedals 2108 (e.g., a pedal, a combination of pedals, etc.) in a particular manner may cause one or more functions of the smart piano system to be performed. For example, upon a user operate one or more particular pedals 2108, the smart piano system may generate and/or detect one or more pedal signals indicative of the operation of the pedal(s). The smart piano system can also identify one or more functions corresponding to the operation of the pedal (s) based on the pedal signals. The smart piano system can then perform the functions. In some embodiments, a user may cause different functions of the smart piano system to be performed by operating a particular function-selection pedal in various manners. For example, a first function may be performed when the user operates the function-selection pedal once. A second function may be performed when the user operates the pedal multiple times within a time interval. In some embodiments, a user may cause different functions of the smart piano system to be performed by operating multiple function-selection pedals in a particular order and/ or combination (e.g., by operating the function-selection pedals simultaneously or substantially simultaneously, by operating the function-selection pedals sequentially, etc.).

It should be noted that the display engine described above is provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Figure 22:
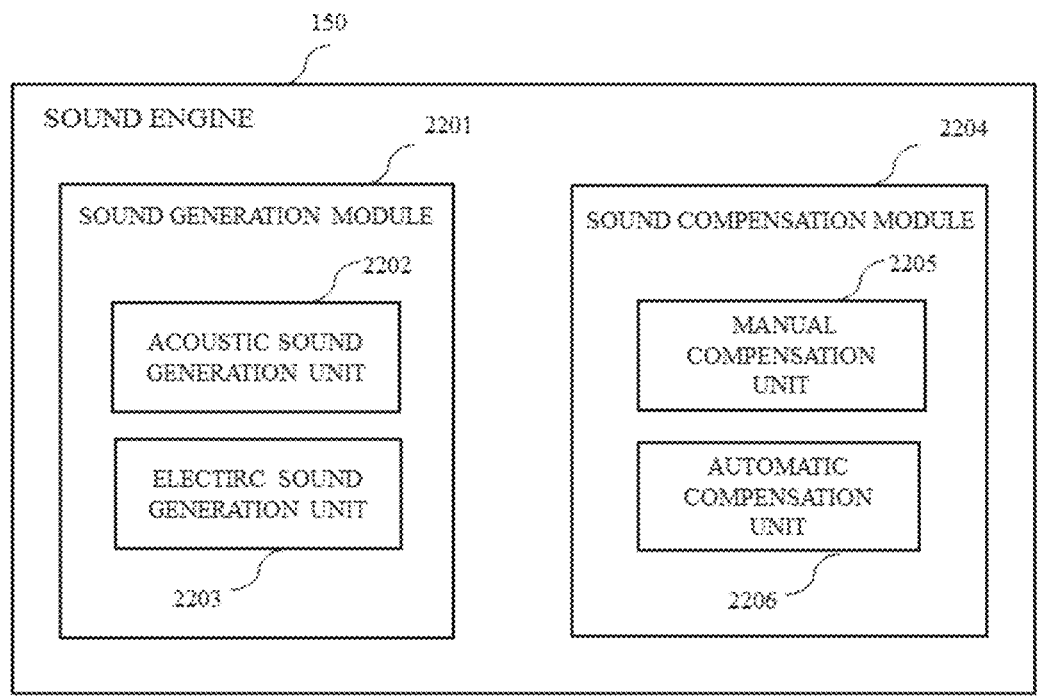
FIG. 22 is a block diagram illustrating an example of a sound engine according to some embodiments of the present disclosure.

FIG. 22 is a block diagram illustrating an example of a sound engine according to some embodiments of the present disclosure. As shown, the sound engine 150 may include a sound generation module 2201, a sound compensation module 2204, and/or any other component for performing various functions of the sound engine in accordance with the present disclosure. The sound compensation module 2204 may further include a manual compensation unit 2205, an automatic compensation unit 2206, and/or any other component for sound compensation.

More or less components may be included in the sound engine 150 without loss of generality. For example, two of the modules and/or units may be combined into a single module and/or unit, or one of the modules and/or units may be divided into two or more modules and/or units. In one implementation, one or more of the modules and/or units may reside on different computing devices (e.g., desktops, laptops, mobile phones, tablet computers, wearable computing devices, etc.). In some embodiments, the sound engine of FIG. 22 may be and/or include the sound engine 150 as described above in connection with FIG. 1.

The sound generation module 2201 may further include an acoustic sound generation unit 2202, an electric sound generation unit 2203, and/or any other component for generating sounds in accordance with the present disclosure. The acoustic sound generation unit 2202 may generate acoustic sounds via one or more acoustic parts, such as key actuators, and pedal actuators. In some embodiments, the key actuators and pedal actuators may operate the keys and pedals without involvement of a user. Merely by way of example, the key actuators and pedal actuators may include one or more motors driven by PMW mechanisms.

The electric sound generation module 2203 may generate electric sounds. For example, the electric sound generation module 2203 can generate audio content using one or more synthesizers, sequencers, audio codecs, digital processors, and/or any other device that can generate audio content representative of sounds. In some embodiments, the audio content may be included in one or more electric signals (e.g., analog signals, digital signals, etc.). The electric sound generation module 2203 can also provide playback of the audio content via one or more speakers. In some embodiments, the speakers may be located under the keyboard of the piano to improve quality of the electric sounds received by audiences (e.g., the player).

The sound compensation module 2204 may perform sound compensation. As illustrated in FIG. 22, the sound compensation module 2204 may further include a manual compensation unit 2205, an automatic compensation unit 2206, and any other part implementing sound compensation. The manual compensation unit 2205 may be configured to implement various compensation modes. The compensation modes may include one or more modes indicating no sound compensation, one or more modes indicating sounds with certain sound frequencies may be provided, one or more modes indicating sounds with certain volumes may be provided, one or more modes indicating sound compensation may be performed when certain musical notes are played, and any other suitable compensation mode.

The automatic compensation unit 2206 may be configured to acquire information that can be used to perform sound compensation. Such information can include environmental information, a type of the piano (e.g., an upright piano, a grand piano, etc.), user preferences (e.g., a particular compensation mode to be performed), etc. The environmental information may include but not limit to information about an acoustic environment in which the piano is played, such as the size of a room in which the piano is played, the structure of the room, noise in the acoustic environment (e.g., ambient noise), etc. The environmental information may be detected by one or more detectors. For example, room structure and room size may be detected by ultrasound detectors. As another example, ambient noise may be detected by sound detectors. One or more compensation parameters (e.g., one or more parameters about volume, frequencies, timbres, and/or any other characteristic of sounds generated to perform the sound compensation, etc.) may be generated based on the environmental information, the type of the piano, and/or any other information. For example, if the smart piano system is installed in a noisy environment, the smart piano system may increase the volume of the sounds generated by the sound generation module 2201. As another example, frequencies of the sound may be determined based on the type of the piano. More particularly, for example, low frequency components may be added to compensate sounds produced by an upright piano.

It should be noted that the sound engine described above is provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Figure 23:
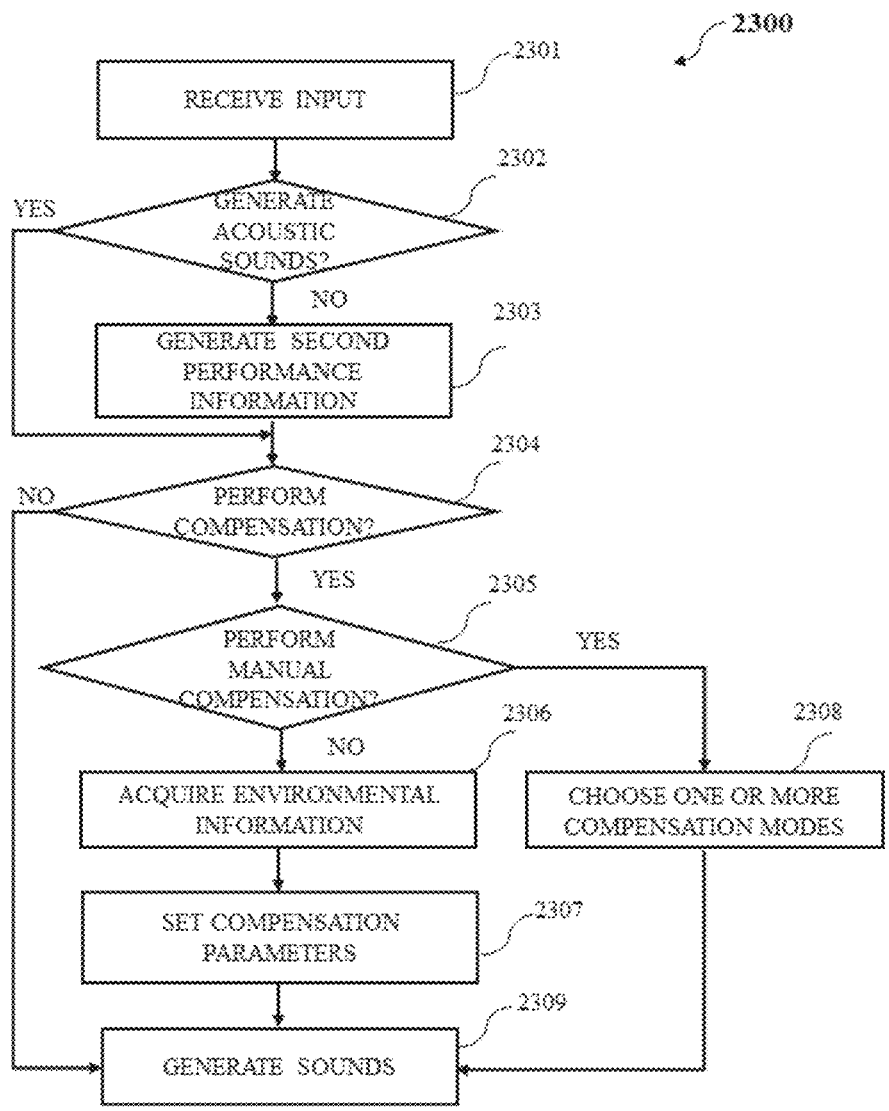
FIG. 23 is a flowchart illustrating an example of a process for a sound engine according to some embodiments of the present disclosure.

FIG. 23 is a flowchart illustrating an example 2300 of a process for a sound engine according to some embodiments of the present disclosure. Process 2300 may be performed by processing logic that comprises hardware (e.g., circuitry, dedicated logic, programmable logic, microcode, etc.), software (e.g., instructions run on a processing device to perform hardware simulation), or a combination thereof. In some implementations, process 2300 may be performed by a processing device 105 as described above in connection with FIG. 1.

Process 2300 may begin by receiving inputs about sound generation and/or sound compensation. The inputs may be and/or include one or more user inputs, instructions generated by the controller 160, musical data about one or more performances, etc. The inputs may include one or more instructions indicating a user request to perform sound compensation, one or more settings for sound generation and/or sound compensation (e.g., setting start and end time for the sound compensation, volumes and frequencies of sounds, etc.), and/or any other information about the sound generation and/or sound compensation. Merely by way of example, the smart piano system may acquire inputs by the player about whether acoustic music may be played, or whether the manual compensation may be performed.

In step 2302, the smart piano system may determine if acoustic sounds are to be generated. The acoustic sounds may be generated based on the inputs received in step 2301. If the acoustic sounds may be played, process 2300 may then go to step 2304. If the acoustic sounds may not be played, process 2300 may then go to step 2303.

In step 2303, a second performance information may be generated based on the musical data about one or more performances. The musical data may be obtained from the external input engine 140, the storage device 130, a database, and/or any suitable storage device. The second performance information may be generated based on the methods described in connection with FIG. 14.

In step 2304, the smart piano system may determine if sound compensation is to be performed. This determination may be made based on the inputs received in step 2301 and/or any other step. If sound compensation is not to be performed, process 2300 may then go to step 2308. If the sound compensation is to be performed, process 2300 may go to step 2305.

In step 2305, the smart piano system may determine if manual compensation is to be performed. This determination may be made based on the inputs received in step 2301 and/or any other step. If manual compensation is to be performed, process 2300 may then go to step 2308. If the manual compensation may not be performed, process 2300 may then go to step 2306.

In step 2306, the smart piano system may acquire information that can be used to perform sound compensation. Such information can include environmental information, a type of the piano (e.g., an upright piano, a grand piano, etc.), user preferences (e.g., a particular compensation mode to be performed), etc. The information may be acquired by the automatic compensation unit 2206 using methods described in connection with FIG. 22.

In step 2307, one or more compensation parameters may be generated. The one or more compensation parameters (e.g., volumes, frequencies, timbres of sounds, etc.) may be generated based on the inputs receiving in step 2301 and/or any other step, the environmental information, and any other information in process 2300.

In step 2308, the smart piano system may provide one or more compensation modes for the player. The one or more compensation modes may be selected based on methods described in connection with FIG. 22 above.

In step 2309, the acoustic sounds and/or the electric sounds may be generated. The acoustic sounds and/or the electric sounds may be generated based on the second performance information, the environmental information, the compensation parameters, the compensation modes, and any other information. For example, the compensation parameters may define various characteristics (e.g., volumes, frequencies, etc.) of the sounds.

It should be noted that the above steps of the flow diagrams of FIGS. 2A, 2B, 9, 10, 12, 15, 17, 19, and 23 can be executed or performed in any order or sequence not limited to the order and sequence shown and described in the figures. Also, some of the above steps of the flow diagrams of FIGS. 2A, 2B, 9, 10, 12, 15, 17, 19, and 23 can be executed or performed substantially simultaneously where appropriate or in parallel to reduce latency and processing times. Furthermore, it should be noted that FIGS. 2A, 2B, 9, 10, 12, 15, 17, 19, and 23 are provided as examples only. At least some of the steps shown in these figures can be performed in a different order than represented, performed concurrently, or altogether omitted.

Figure 24:
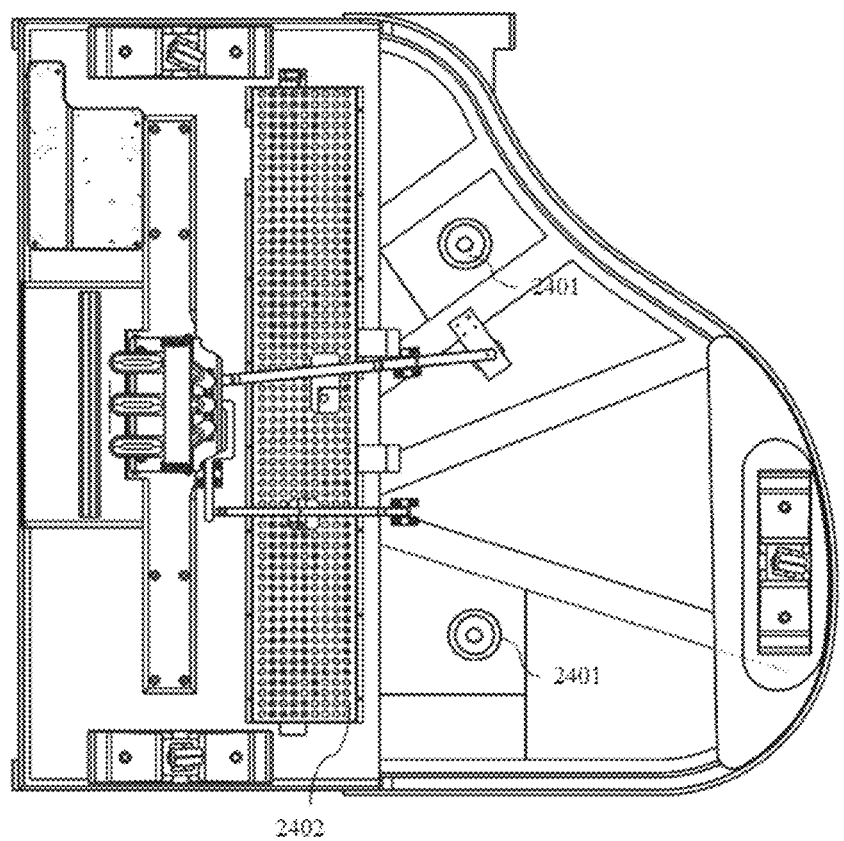
FIG. 24 illustrates another example of a sound engine according to some embodiments of the present disclosure.

FIG. 24 illustrates another example of a sound engine according to some embodiments of the present disclosure. As shown, the sound engine may include one or more speakers 2401, key actuators 2402, and/or any other component of the sound engine.

More or less components may be included in the sound engine without loss of generality. For example, two of the components may be combined into a single component, or one of the component may be divided into two or more components. In one implementation, one or more of the components may reside on different computing devices (e.g., desktops, laptops, mobile phones, tablet computers, wearable computing devices, etc.). In some embodiments, the sound engine of FIG. 22 may be and/or include the sound engine 150 as described above in connection with FIG. 1.

The speakers 2401 may generate electric sounds. The speakers (e.g., 2.1 speakers) may be capable of generating a wide array of various frequencies and timbres. The speakers may be installed on the piano 110 or apart from the piano 110. In some embodiments, the speakers 2401 may be installed under the keyboard of a piano 110 to minimize distance between sound source (i.e., the speakers) and audiences (e.g., the player), and provide clear sounds to the audiences.

The key actuators 2402 may be used to generate acoustic sounds by striking the keys on the keyboard. The key actuators 2402 may be driven by one or more motors using PWM mechanisms. The key actuators 2402 may strike the keys on the keyboard with a steady frequency. In some embodiments, the smart piano system may transmit the first and/or the second performance information about a piece of music to the sound engine, and direct the key actuators to play the piece of music.

It should be noted that the sound engine and the process for the sound engine described above are provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Figure 25:
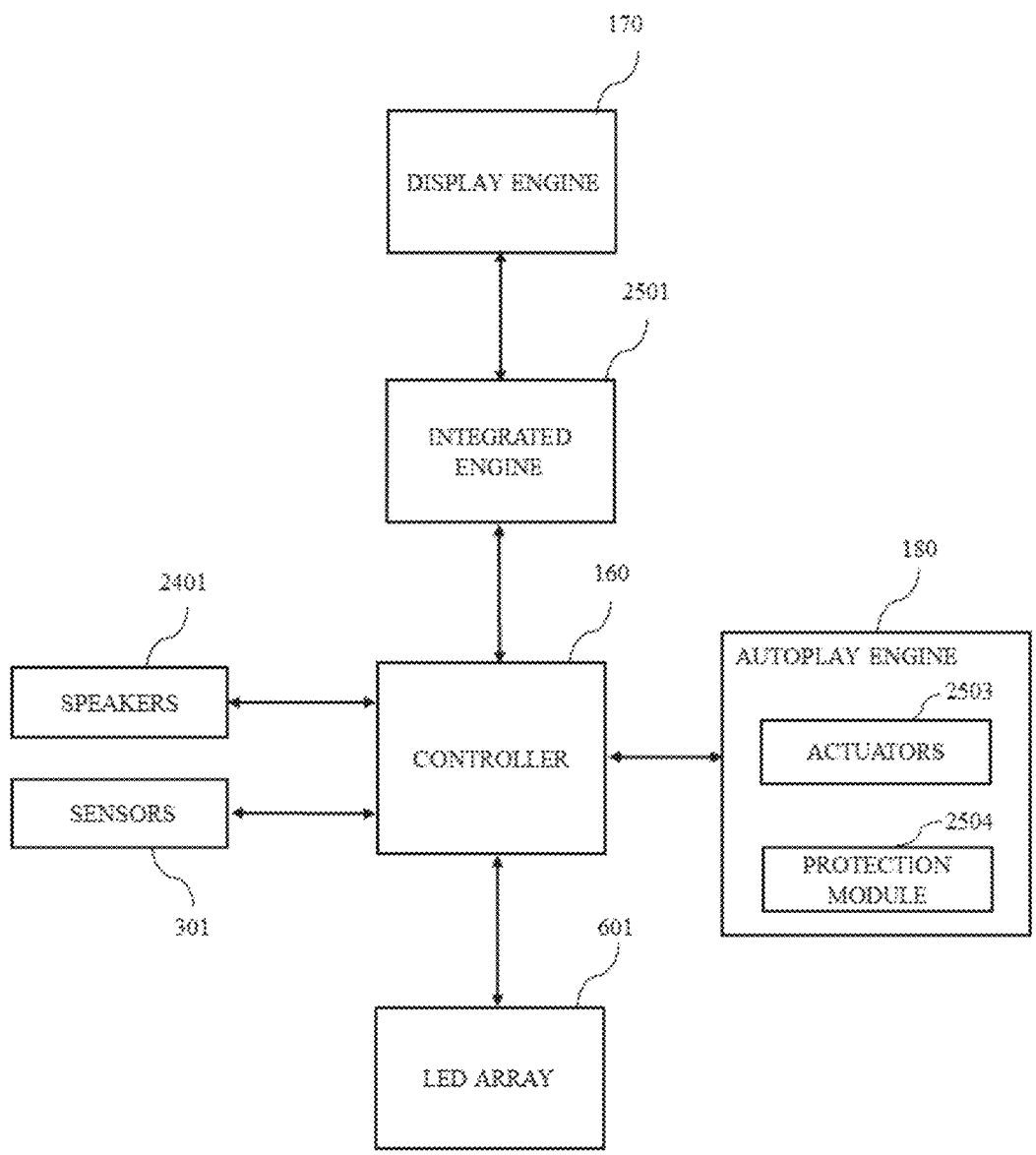
FIGS. 25, 26A, and 26B illustrate a piano equipped with an exemplary piano system according to some embodiments of the present disclosure.
Figure 26A:
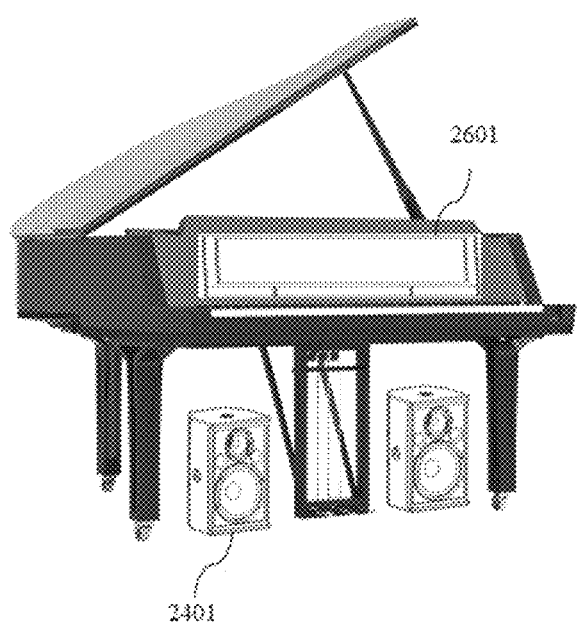

FIGS. 25 and 26 illustrate a piano equipped with an exemplary smart piano system according to some embodiments of the present disclosure. As illustrated in FIG. 25, the smart piano system may include an integrated device 2501, a display engine 170, a controller 160, one or more speakers 2401, an array of LED 601, one or more sensors 301, an autoplay engine 180, and/or any other component for implementing various functions of the smart piano system.

More or less components may be included in the smart piano system without loss of generality. For example, two of the modules may be combined into a single module, or one of the modules may be divided into two or more modules. In one implementation, one or more of the modules may reside on different computing devices (e.g., desktops, laptops, mobile phones, tablet computers, wearable computing devices, etc.). In some embodiments, the controller of FIG. 25 may be and/or include the smart piano system 100 as described above in connection with FIG. 1.

The integrated device 2501 may receive, process, store and/or transmit data (e.g., the first performance information, the second performance information, musical data, etc.) in the smart piano system. Exemplary integrated device 2501 may be a desktop computer (e.g., MAC MINI), a personal computer, a laptop, a MP3 player, MP4 player, and/or any other suitable device. In some embodiments, the integrated device 2501 may transmit the data to the storage device 130, the sound engine 150, the controller, the display engine 170. In some embodiments, the integrated device 2501 may also serve as the external input engine 140 to introduce musical data into the controller 160. In some embodiments, the integrated device 2501 may include one or more applications to process the data. For example, the integrated device 2501 may extract musical notes from a picture containing a written musical manuscript certain applications (e.g., optical character reader).

The array of LED 601 may emit beams of light (e.g., ultraviolet light, visible light, infrared light, etc.) to indicate keys to be depressed for a player. In some embodiments, the array of LED 601 may be installed above the keyboard of the piano 110.

The autoplay engine of FIG. 25 may be and/or include the autoplay engine 180 as described in connection with FIG. 1 above. As shown in FIG. 25, the autoplay engine 180 may include one or more actuators 2503, a protection module 2504, and/or any other component for performing various functions of the autoplay engine according to some embodiments of the present disclosure.

In some embodiments, the actuator(s) 2503 may include one or more key actuators, one or more pedal actuators, and/or any other component for implementing the autoplay engine 180. The key actuator(s) may strike one or more keys of a piano (e.g., a piano as described in connection with FIG. 1). The one or more pedal actuators may operate one or more pedals of a piano (e.g., a piano as described in connection with FIG. 1). The actuator 2503 may be driven by one or more motors. For example, one or more actuators 2503 may include one or more digital solenoids to provide energy for striking one or more keys and/or pedals.

In some embodiments, the protection module 2504 may perform one or more protective functions (e.g., detecting temperature of one or more actuators 2503, adjusting a current, voltage, and/or rating of one or more digital solenoids, detecting and recording deterioration condition of the autoplay engine 180, and/or any other component of the smart piano system, etc.) to maintain functional and structural consistency of the autoplay engine 180 and/or any other component of the smart piano system. For example, the protection module 2504 may include one or more temperature sensors to detect temperature of the digital solenoids. In such example, the protection module 2504 may adjust power supply for the digital solenoids based on changes in the temperature. In some embodiments, if the temperature reaches a threshold, the protection module 2504 may adjust power supply (e.g., by decreasing the current applied to the digital solenoids, cutting off the power supply, etc.) to decrease the temperature of the digital solenoids. After the digital solenoids cool down (e.g., when the temperature is lower than the threshold), the protection module 2504 may adjust the power supply to implement functions of the actuators (e.g., by increasing the electric current, providing electric supply, etc.). In some embodiments, the threshold may be set according to one or more characteristics of the digital solenoids, such as the size of the digital solenoids, a current and/or voltage applied to the digital solenoids, the rating of the digital solenoids, materials of the digital solenoids, the number of the digital solenoids used in the smart piano system, etc. The threshold may also be set according to one or more tests about performance of the digital solenoids in a range of temperatures and/or any other information that can be used to determine the threshold.

The smart piano system further includes one or more speakers. As illustrated in FIG. 26, the speakers 2401 may not be installed on the piano 110. The speaker 2401 may be installed apart from the piano 110. In some embodiments, the speaker 2401 may connect to the piano 110 via short-distance communication (e.g., Bluetooth, ZigBee, Wi-Fi, etc.), and/or long-distance communication (e.g., optical fiber, WLAN, radio wave).

Figure 26B:
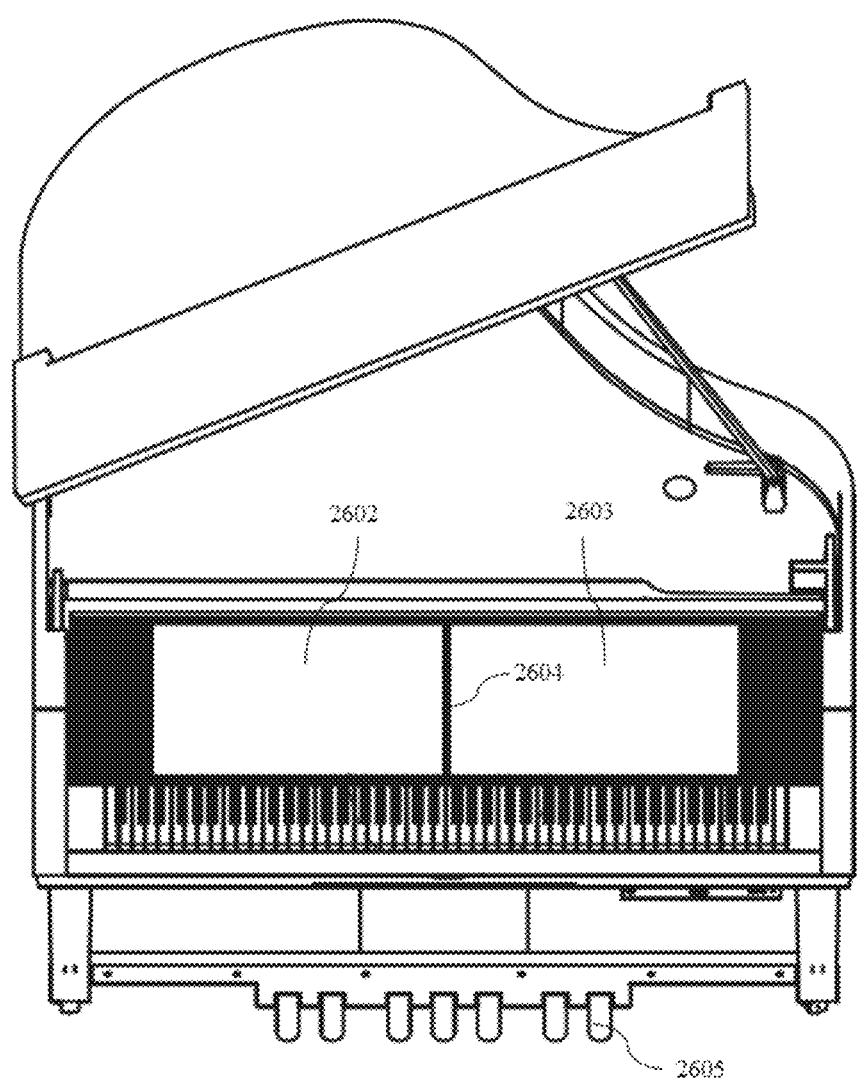

The smart piano system may further include one or more screens (as described in connection with FIG. 1). Multiple screens may be used to present content in accordance with various embodiments of the present disclosure. In some embodiments, as illustrated in FIG. 26B, the smart piano system may include screens 2602 and 2603. In some embodiments, screens 2602 and 2603 may be installed adjacent to a keyboard of a piano. Screens 2602 and/or 2603 may also be perpendicular or parallel to the keyboard. For example, one or more screens may be installed in the body of the piano and be parallel to the keyboard. One or more screens may be installed above the keyboard and may be perpendicular to the keyboard. While two screens are illustrated in FIG. 26B, this is merely illustrative. For example, any suitable number of screens (e.g., one, three, etc.) may be used to facilitate various functions of the smart piano system in accordance with various embodiments of the present disclosure.

As shown in FIG. 26B, joint section 2604 of the screens 2602 and 2603 may include a boundary of the screen 2602 (e.g., the right boundary), a boundary of the screen 2603 (e.g., the left boundary), space between the screens, etc. In some embodiments, joint section 2604 may be aligned with two successive portions of the real keyboard (e.g., two successive real keys of the real keyboard). For example, as shown in FIG. 26B, the joint section 2604 may align with (e.g., pointing to or substantially pointing to) a gap between two successive real keys of the piano (e.g., two adjacent white keys, a white key and an adjacent black key, etc.). The width of the joint section 2604 may substantially be equal to the gap between the successive keys. In such example, the gap between the two successive keys is not presented in the screens 2602 or 2603 in the form of virtual keys. The rest portions of the two successive keys can be presented by the screen 2602 and/or the screen 2603.

Content presented on screens 2602 and 2603 may or may not be the same. For example, screens 2602 and/or 2603 may present a virtual keyboard (as described in connection with FIG. 21A-G). More particularly, for example, each of screens 2602 and 2603 may present one or more portions of the virtual keyboard (e.g., content related to one or more virtual keys of the keyboard) so that content related to the virtual keyboard is presented on screens 2602 and 2603. In some embodiments, the portion(s) of the virtual keyboard presented on the screen 2602 and the portion(s) of the virtual keyboard presented on the screen 2603 constitute a complete virtual keyboard. Each virtual key of the virtual keyboard may correspond to one real key in the keyboard of the piano. After depressing one real key, the screen 2602 and/or the screen 2603 may present content indicating that the corresponding virtual key is also depressed.

As another example, screens 2602 and/or 2603 may present symbols related to one or more pedals 2605. The one or more pedals 2605 may include one or more pedals for playing a piece of music, and one or more function-selection pedals (as described in connection with FIG. 21H). The symbols related to one or more pedals 2605 may include one or more virtual pedals (each pedals of the piano may correspond to one or more virtual pedals), symbols indicative of one or more functions triggered by function-selecting pedal(s), and/or any other symbols related to the one or more pedals 2605.

Screens 2602 and 2603 may or may not communicate with other component of the smart piano system using the same method. In some embodiments, the screens may communicate with each other directly. For example, one screen may receive, transmit, process, and/or store data from the other screen. The data may include displaying parameters, the first performance information, the second performance information, and/or any other data for presenting contents on the screens. Two screens may communicate with each other indirectly. For example, the screens may communicate with each other via the display engine 170, the controller 160, and/or any other part of the smart piano system.

Screens 2602 and 2603 may or may not have the same type. In some embodiments, one screen may be one of a liquid crystal display (LCD), a light emitting diode (LED)-based display, a flat panel display or curved screen, a television device, a cathode ray tube (CRT), or the like. Two screens may be different with each other. For example, the screen 2602 may be a liquid crystal display for presenting music sheet, while the screen 2603 may be a LED-based display for presenting one or more virtual keys.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "generating," "providing," "calculating," "executing," "storing," "producing," "determining," "obtaining," "calibrating," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, any suitable media that is fleeting and devoid of any semblance of permanence during transmission, and/or any suitable intangible media.

It should be noted that the piano equipped with the smart piano system in some specific embodiments is provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the present disclosure are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A piano system, comprising:
  a processing device to:
    receive a plurality of key signals related to a first performance of a piece of music, wherein each of the plurality of key signals corresponds to motion of at least one key of a piano during the first performance;
    determine positional information about a first key of the piano based on a first key signal, wherein the plurality of key signals comprises the first key signal, and wherein to determine the positional information about a first key of the piano based on a first key signal, the processing device is further to:
      compare a plurality of values of the first key signal with a plurality of reference values, and wherein the plurality of reference values corresponds to a plurality of positions of the first key;
    generate first performance information based on the plurality of key signals;

receive musical data related to a second performance of the piece of music;

generate second performance information based on the musical data; and provide content for presentation on a display device based on the first performance information and the second performance information.

2. The piano system of claim 1, further comprising a plurality of key sensors configured to generate the plurality of key signals.

3. The piano system of claim 1, wherein the processing device is further to:

receive a first pedal signal corresponding to motion of a pedal of the piano during the first performance; and generate the first performance information based on the pedal signal.

4. The piano system of claim 3, wherein the processing device is further to perform at least one function based on an input received via a function-selection pedal, wherein the function comprises at least one of turning pages of a music sheet, presenting at least a portion of the content on the display device, or adjusting one or more parameters related to presentation of the content.

5. The piano system of claim 4, wherein the piano system further comprises a pedal sensor configured to generate a second pedal signal based on the input received via the function-selection pedal, and wherein the processing device is further to perform the at least one function in response to receiving the second pedal signal.

6. The piano system of claim 1, wherein, to provide the content for presentation on the display device, the processing device is further to generate at least one display parameter for displaying the content.

7. The piano system of claim 1, wherein the processing device is further to generate the content based on the second performance information, and wherein the content comprises at least one content item indicative of a strength to be applied to a key of the piano, an operation sequence of a plurality of keys of the piano, or a music sheet.

8. The piano system of claim 1, wherein the first performance information comprises at least one of an operation sequence of a plurality of piano keys, positional information about the piano keys, or a musical note, and the second performance information comprises at least one of an operation sequence of a plurality of piano keys, positional information about the piano keys, or a musical note.

9. The piano system of claim 1, wherein the content comprises at least one virtual keyboard, and wherein the virtual keyboard comprises a plurality of virtual keys corresponding to a plurality of real keys of the piano.

10. The piano system of claim 1, wherein the processing device is further to perform sound compensation based on at least one of information of an acoustic environment, a type of the piano, or the first performance information.

11. The piano system of claim 1, further comprising a plurality of adaptors configured to couple a plurality of substrates to the piano, wherein said plurality of adaptors further comprise at least one connection unit, the connection unit moving in a first direction for a predefined arrange of distance, said connection unit further comprising at least one supporting structure configured to connect a plurality of keys of the piano to the plurality of adaptors.

12. The piano system of claim 1, wherein the processing device is further to:

compare the first performance information with the second performance information;

detect at least one error in the first performance based on the comparison; and provide the content based on the error.

13. A method of providing a piano system, comprising:

receiving a plurality of key signals related to a first performance of a piece of music, wherein each of the plurality of key signals corresponds to motion of at least one key of a piano during the first performance;

determining positional information about a first key of the piano based on a first key signal, wherein the plurality of key signals comprises the first key signal, and wherein the determining positional information about a first key of the piano based on a first key signal, comprising:

comparing a plurality of values of the first key signal with a plurality of reference values, and wherein the plurality of reference values corresponds to a plurality of positions of the first key;

generating, by a processing device, first performance information based on the plurality of key signals;

receiving musical data related to a second performance of the piece of music;

generating second performance information based on the musical data; and providing, by the processing device, content for presentation on a display device based on the first performance information and the second performance information.

14. The method of claim 13, further comprising:

receiving at least one pedal signal corresponding to motion of a pedal of the piano during the first performance; and generating the first performance information based on the pedal signal.

15. The method of claim 13, wherein providing the content for presentation on the display device comprises generating at least one display parameter for displaying the content.

16. The method of claim 13, further comprising generating the content based on the second performance information, wherein the content comprises at least one content item indicative of a strength to be applied to a key of the piano, an operation sequence of a plurality of keys of the piano, or a music sheet.

* * * * *